US008438323B2

(12) United States Patent
Tsuji et al.

(10) Patent No.: US 8,438,323 B2
(45) Date of Patent: May 7, 2013

(54) COMMUNICATION PROCESSING APPARATUS, COMMUNICATION PROCESSING METHOD, CONTROL METHOD AND COMMUNICATION DEVICE OF COMMUNICATION PROCESSING APPARATUS

(75) Inventors: Atsuhiro Tsuji, Osaka (JP); Akihiro Ebina, Kyoto (JP); Yohei Kaneko, Kyoto (JP)

(73) Assignee: Panasonic Corporation, Osaka (JP)

( * ) Notice: Subject to any disclaimer, the term of this patent is extended or adjusted under 35 U.S.C. 154(b) by 308 days.

(21) Appl. No.: 12/992,996

(22) PCT Filed: May 18, 2009

(86) PCT No.: PCT/JP2009/002178
§ 371 (c)(1),
(2), (4) Date: Nov. 16, 2010

(87) PCT Pub. No.: WO2009/141992
PCT Pub. Date: Nov. 26, 2009

(65) Prior Publication Data
US 2011/0078353 A1    Mar. 31, 2011

(30) Foreign Application Priority Data
May 19, 2008    (JP) .................................. 2008-130285

(51) Int. Cl.
*G06F 13/00*    (2006.01)
(52) U.S. Cl.
USPC ............................ 710/266; 710/260; 710/261
(58) Field of Classification Search .................... 710/48, 710/260–262, 266, 268
See application file for complete search history.

(56) References Cited

U.S. PATENT DOCUMENTS

| 6,477,185 | B1 | 11/2002 | Komi et al. |
| 6,539,447 | B1 | 3/2003 | Sawada |
| 7,872,992 | B2 | 1/2011 | Ukita et al. |
| 2008/0031279 | A1 | 2/2008 | Hatakeyama et al. |
| 2009/0238196 | A1 | 9/2009 | Ukita et al. |
| 2010/0106874 | A1* | 4/2010 | Dominguez et al. .......... 710/260 |
| 2011/0078353 | A1* | 3/2011 | Tsuji et al. ..................... 710/260 |

FOREIGN PATENT DOCUMENTS

| JP | 2723970 | 11/1997 |
| JP | 11-150564 | 6/1999 |
| JP | 2000-330796 | 11/2000 |
| JP | 2002-217971 | 8/2002 |

(Continued)

OTHER PUBLICATIONS

International Search Report issued Aug. 18, 2009 in corresponding International Application No. PCT/JP2009/002178.

*Primary Examiner* — Glenn A Auve
(74) *Attorney, Agent, or Firm* — Wenderoth, Lind & Ponack, L.L.P.

(57) ABSTRACT

A communication processing apparatus (101) includes: a MAC unit (106) receiving a packet; a classification unit (107) classifying the received packet; a transfer control unit (104) transferring data of the classified packet to a main memory (102); a first memory (112m) storing an interrupt management table (112); an interrupt control unit (111) specifying, with reference to the interrupt management table (112), an interrupt control method associated with the classification of the packet classified by the classification unit (107) and outputting an interrupt signal to a CPU (103) using the specified interrupt control method; and a setting unit (110) registering the classification and the interrupt control method into the interrupt management table (112) according to instructions from an application program activated in the CPU (103) so as to update the interrupt management table (112).

9 Claims, 18 Drawing Sheets

FOREIGN PATENT DOCUMENTS

| JP | 2003-152789 | 5/2003 |
| JP | 2006-41686 | 2/2006 |
| JP | 2008-59577 | 3/2008 |
| WO | 2007/066766 | 6/2007 |

* cited by examiner

FIG. 3

| Classification Identifier | Classification Parameter | | | |
|---|---|---|---|---|
| | Protocol | Destination IP Address | Source Port Number (Communication Partner Port Number) | Destination Port Number (Self Port Number) |
| 1 | TCP | 192.168.3.4 | 80 | 10001 |
| 2 | TCP | 192.168.1.8 | 10001 | 10002 |
| 3 | TCP | 192.168.20.3 | 10002 | 10003 |
| 4 | UDP | 192.168.100.100 | 10003 | 10004 |
| Default | * | * | * | * |

| Classification Identifier | Traffic Type | |
|---|---|---|
| 1 | Stream | (Timer Interrupt) |
| 2 | Immediate | (Immediate Interrupt) |
| 3 | Download | (Timer Interrupt with Processing Amount Restriction) |
| 4 | Immediate | (Immediate Interrupt) |
| Default | Non-preferred | (Delay Interrupt) |

| Classification Identifier | Classification Parameter | | | | Traffic Type |
|---|---|---|---|---|---|
| | Protocol | Destination IP Address | Source Port Number (Communication Partner Port Number) | Destination Port Number (Self Port Number) | |
| 1 | TCP | 192.168.3.4 | 80 | 10001 | Stream |
| 2 | TCP | 192.168.1.8 | 10001 | 10002 | Immediate |
| 3 | TCP | 192.168.20.3 | 10002 | 10003 | Download |
| 4 | UDP | 192.168.100.100 | 10003 | 10004 | Immediate |
| Default | * | * | * | * | Non-preferred |

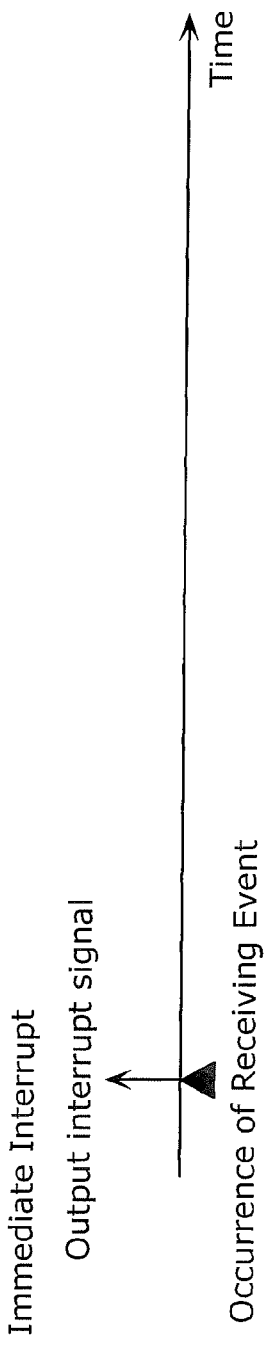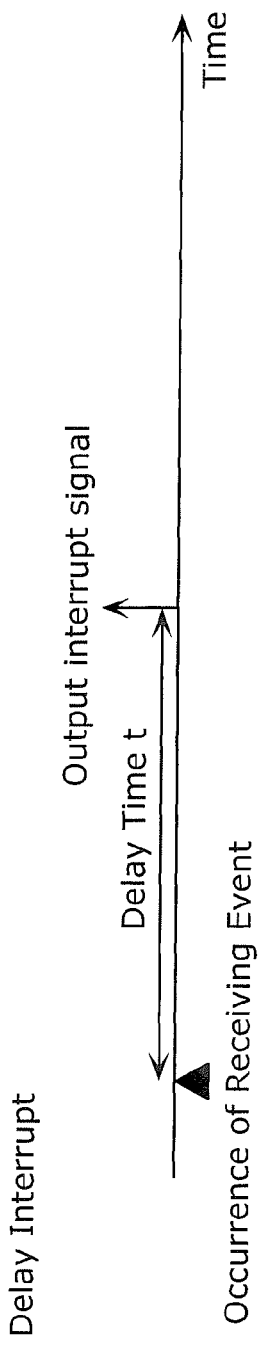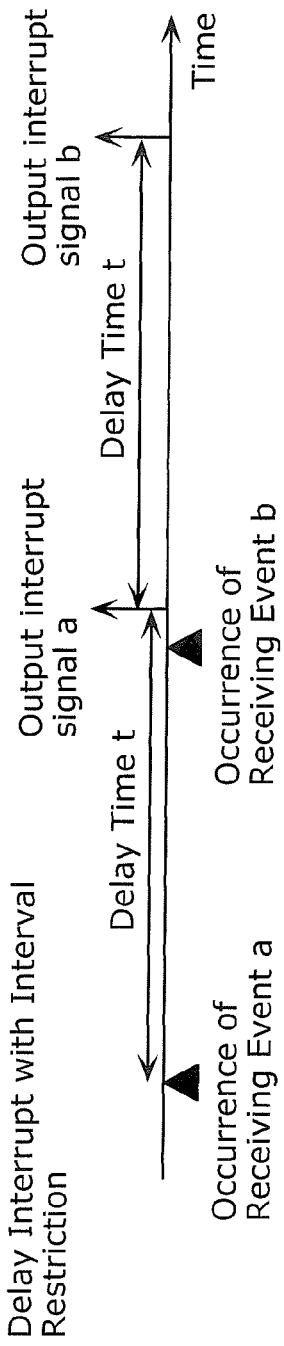

COMMUNICATION PROCESSING APPARATUS, COMMUNICATION PROCESSING METHOD, CONTROL METHOD AND COMMUNICATION DEVICE OF COMMUNICATION PROCESSING APPARATUS

TECHNICAL FIELD

The present invention relates to communication processing apparatuses that receive data such as packets and process the received data, and communication processing methods used by the communication processing apparatuses. More particularly, the present invention relates to a communication processing apparatus that controls packet interrupt in Internet Protocol (IP) communication and the like, and a communication processing method used by the communication processing apparatus.

BACKGROUND ART

Conventionally, communication devices that perform interrupt control in IP communication and the like have been provided.

FIG. 17 is a block diagram illustrating a structure of a general communication device that performs interrupt control.

In general, a communication device 2000 includes, as illustrated in FIG. 17, structural elements which are a communication processing apparatus 2201, a main memory 2102, a Control Processing Unit (CPU) 2103, and the like. The structural elements are connected to one another via a system bus 2202. Operations of the structural elements are controlled by software executed on the CPU 2103.

It is common that the communication processing apparatus 2201 included in such communication device 2000 has an interrupt function. The interrupt function is realized by outputting signals (interrupt signals) from the communication processing apparatus 2201 to the CPU 2103. The interrupt function makes it possible to immediately notify the CPU 2103 with various events occurred in the communication processing apparatus 2201, and speedily execute the corresponding processing by software. The events include, for example, receiving of communication data (packets), completion of packet transmission, occurrence of abnormal conditions, and the like.

Conventionally, there are some methods for outputting an interrupt signal caused by receipt of a packet. The first method is a method of outputting an interrupt signal for each receipt of packet. The second method is a method of continuing outputting interrupt signals after the communication processing apparatus 2201 receives packets until no more packet out of the management of the communication processing apparatus 2201 is left in the communication processing apparatus 2201 due to software execution. By the second method, as long as there is any received packet under the management of the communication processing apparatus 2201, interrupts occur to the software (the software temporarily stops the interrupts so as to continue the original processing). Furthermore, as the third method, there is a method (delay interrupt) of outputting an interrupt signal to be delayed by a predetermined time from a timing of packet receipt of the communication processing apparatus 2201, as seen in DP83816 of National Semiconductor™. The delay interrupt is useful as a method of reducing a software processing amount caused by the interrupt, in the situation where short packets are frequently received, for example. On the other hand, there is also proposed that, in order to reduce such a software processing amount caused by interrupts, the state of the communication processing apparatus 2201 is regularly monitored and controlled by using a timer function which an Operation System (OS) as basic software has, without using the interrupt function for receipt processing. However, this timer function by software has a rough accuracy (on the order of several dozens msec), and the timer function itself increases the software processing amount. Therefore, the method is not always preferred for CPUs in home electronics having low CUP processing performance. In addition, since packet receipt is an event caused by the outside, the timer function should be always effective to allow the time function to check packet receipt of the communication processing apparatus 2201. This increases unnecessarily a software processing amount.

Meanwhile, it is common that a plurality of packets received by the communication processing apparatus 2201 include packets belonging to various application programs (hereinafter, referred to simply as an application). Especially when general-purpose IP communication is used, packets belonging to applications using different session protocols such as HyperText Transfer Protocol (HTTP), File Transfer Protocol (FTP), and Simple Mail Transfer Protocol (SMTP)/Post Office Protocol (POP) 3 (mail function) are mixed. Even using the same HTTP, processing of the applications vary from Web browsing to video streaming. Therefore, various factors are sometimes mixed regarding amounts and immediacy of received packets. Moreover, when Transmission Control Protocol (TCP) is used as a Transport layer, a throughput that is transfer performance is affected by processing is delay between transfer terminals. It is therefore preferable that Acknowledgment (ACK) receipt that is acknowledgment is processed earlier.

As described above, since various factors are mixed for received packets handled by a single communication processing apparatus 2201, a communication device that classifies received packets in the communication processing apparatus 2201 to be managed and thereby makes processing of software easy is proposed (for example, see Patent Reference 1).

The communication device disclosed in the above-mentioned Patent Reference 1 uses Rings each unique to a corresponding packet classification, while a transfer control unit, which will be described later in detail, uses transfer management descriptors (Descriptors) to manage and control received packets. In the communication device of the Patent Reference 1, general-purpose hierarchy processing such as processing of Transmission Control Protocol (TCP)/Internet Protocol (IP) stacks is not performed for received packets transferred to the main memory, and each application directly handles the above-mentioned Ring. As a result, the communication device of the Patent Reference 1 can reduce a number of processes of copying the received packets in the main memory.

FIG. 18 is a block diagram for comparing the communication device 2000 of the above-described Patent Reference 1 to the present invention. The communication processing apparatus 2201 in the communication device 2000 of the above-described Patent Reference 1 includes a transfer control unit 2304, a transmission data holding unit 2105, a MAC unit 2106, a classification unit 2107, a classification table 2108, a received-data holding unit 2109, a setting unit 2310, and a interrupt control unit 2311.

In transmission processing, the transfer control unit 2304 transfers data of a to-be-transmitted packet to the transmission data holding unit 2105, managing and controlling packet data transfer between the communication processing apparatus 2201 and the main memory 2102. Furthermore, for receipt processing, the transfer control unit 2304 transfers data of a received packet from the received-data holding unit 2109 to the main memory 2102. The transmission data holding unit 2105 transfers the data of the to-be-transmitted packet transferred from the transfer control unit 2304, to the MAC unit 2106. The MAC unit 2106 performs transmission processing compliant with a predetermined Media Access Control (MAC) standard for the data of the to-be-transmitted packet transferred from the transmission data holding unit 2105. In addition, the MAC unit 2106 performs receipt processing compliant with the predetermined MAC standard for the data of the received packet, and transfers the data to the classification unit 2107. Here, external blocks connected with the MAC unit 2106 depend on a physical layer. They are interfaces (I/F) connected to a network connected to the communication device 2000.

The classification unit 2107 classifies the data of the received packet transferred from the MAC unit 2106 with reference to the classification table 2108, and thereby transfers the data together with classification information to the received-data holding unit 2109. The received-data holding unit 2109 holds the data of the received packet transferred from the classification unit 2107 and the classification information in association with each other. For receipt processing, the transfer control unit 2304 transfers the data of the received packet which is held in the received-data holding unit 2109 to the main memory 2102 based on the associated classification information. Here, the transfer control unit 2304 notifies the interrupt control unit 2311 of the fact that the data of the received packet has been transferred to the main memory 2102, and the interrupt control unit 2311 thereby outputs an interrupt signal to the CPU 2103 according to the notification from the transfer control unit 2304. In addition, the setting unit 2310 receives a setting change request for the classification table 2108 which is issued from the CPU 2103, and thereby changes the classification table 2108.

Moreover, there is also proposed a communication device that controls interrupt of packet receipt by using a method depending on a type of the received packet (for example, see Patent Reference 2). The communication device disclosed in the Patent Reference 2 analyzes a type of each received packet, thereby determines whether or not the received packet is a real-time packet, and transfers the received packet to a buffer. If it is determined that the received packet is a real-time packet, the communication device immediately outputs an interrupt signal to a CPU. On the other hand, if it is determined that the received packet is not a real-time packet, the communication device outputs an interrupt signal to the CPU after a predetermined time has passed since the packet receipt or after a predetermined amount of data has been accumulated in the buffer. In short, the communication device of the above-described Patent Reference 2 switches an interrupt control method for each received packet depending on a type of the received packet.

PRIOR ARTS

Patent References

[Patent Reference 1] Japanese Patent Publication No. 2723970
[Patent Reference 2] Japanese Unexamined Patent Application Publication No. 2008-59577

DISCLOSURE OF INVENTION

Problems that Invention is to Solve

However, the conventional communication devices including those disclosed in the Patent References 1 and 2 have a problem of failing to perform interrupt properly according to application processing while suppressing a software receipt processing load on the communication device.

More specifically, the conventional communication devices have the following five situations.
(a) The communication device of the Patent Reference 1 cannot perform interrupt control to satisfy different requirements of respective classifications of received packets.
(b) In some of methods for executing software, delay interrupt has a risk not to reduce an interrupt processing amount.
(c) When receipt processing is managed only by a timer function in OS, an unnecessary software processing amount is increased, because it is necessary to operate the timer function even when no packet is received.
(d) When a timer function in OS is used, an accuracy of the timer function is rough (on the order of several dozens msec), and the time function itself increases a software processing amount. The accuracy of the timer function is required to be several hundreds μsec or less in, for example, Ethernet™ having performance of 100 Mbs. The receiving control by the timer function delays the processing even for communication having immediacy.
(e) The communication device of the Patent Reference 2 previously determines interrupt control methods for respective types of received packets.

As a result, when CPUs having relatively low processing performance, such as CPUs for home electronics used, for example, to provide net functions to the home electronics, there are the following four problems.
(1) In an interrupt control method by which an interrupt signal is outputted immediately for each packet receipt, a software processing amount is increased due to the interrupt processing caused by receiving of a large amount of packets for each unit time. As a result, load on a CPU is increased, which eventually increases a risk of causing troubles in application execution originally performed in the communication device.
(2) In a receiving control method using a timer function of OS, it is difficult to realize a timer having a high accuracy (less than several hundreds μsec).
(3) In a receiving control method using a timer function, processing is delayed for communication having immediacy. As a result, a risk of causing the decrease of throughput is increased.
(4) Even if an interrupt control method is switched depending on a type of a received packet, interrupt cannot be performed properly according to the requirements on application processing (receiving/reproducing of video data, for example), because each interrupt control method is fixed to a corresponding type of a receiving packet.

In order to address the above-described problems, an object of the present invention is to provide a communication processing apparatus capable of performing interrupt properly according to application processing while suppressing a software's receipt processing load, and a communication device including the communication processing apparatus.

Means to Solve the Problems

In accordance with an aspect of the present invention for achieving the object, there is provided a communication processing apparatus which receives a packet, transfers data of the packet to a memory, and outputs an interrupt signal to a processing unit to process the data, the communication processing apparatus including: a receiving unit configured to receive a packet; a classification unit configured to classify the packet received by the receiving unit to a classification from among a plurality of classifications depending on a type of the packet; a transfer control unit configured to transfer data of the packet classified by the classification unit to the memory, the packet being received by the receiving unit and classified by the classification unit; a storage unit configured to store an interrupt management table indicating a classification and an interrupt control method in association with each other, the interrupt control method being related to a timing of outputting of an interrupt signal; an interrupt control unit configured to (i) specify, with reference to the interrupt management table, the interrupt control method associated with the classification of the packet classified by the classification unit, and (ii) output the interrupt signal to the processing unit by using the specified interrupt control method; and a setting unit configured to register the classification and the interrupt control method into the interrupt management table according to instruction from an application program activated in the processing unit, so as to update the interrupt management table.

Thereby, an interrupt control method, which is registered in the interrupt management table in association with a type or classification of a received packet, is employed fro the packet. Thereby, an interrupt signal is outputted by using the interrupt control method to the processing unit (for example, a CPU). Therefore, if an interrupt control method, which is proper for receipt processing of a packet having a classification, is registered in association with the classification, it is possible to prevent that interrupt signals are outputted with output occurrence frequencies more than necessity for the packet, while satisfying requirements, such as immediacy, on receipt processing of the packet. In other words, in the processing unit, it is possible to appropriately suppress load of the receipt processing (receipt processing load) of software that processes data of the packet transferred to the memory. For example, an interrupt control method can be switched depending on each packet classification. In more detail, the immediate interrupt method can be selected as an interrupt control method for packets requiring high immediacy. Or, if packets require low immediacy and receipt processing can be performed only once for a group of such packets, the timer interrupt method can be selected as an interrupt control method for such packets. Thereby, an optimum receipt control can be performed depending on a classification of each target packet.

In addition, according to instructions from an application program activated by the processing unit, a classification and an interrupt control method are registered in association with each other into the interrupt management table. Thereby, the application program can register, in to the interrupt management table, (a) a classification of a packet used in communication to be performed by the application program, and (b) an interrupt control method satisfying requirements on processing using the packet. In short, the interrupt management table is rewritable. Since the interrupt management table can be updated in initialization or during operation of the communication processing apparatus, flexible operation is possible, for example, when an activated application program is changed. In other words, since the interrupt control methods defined in the interrupt management table can be changed dynamically, the interrupt management table can be easily applied in the communication device in which a plurality of application programs operate or stop. As a result, it is possible to appropriately perform interrupts according to processing of an application program while suppressing receipt processing load on the software, and thereby appropriately perform the receipt processing.

It is possible that the setting unit is configured to, when the receiving unit receives a packet classified to a different classification that is not indicated in the interrupt management table, add the different classification and an interrupt control method for the packet in association with each other into the interrupt management table according to instruction from the application program, so as to update the interrupt management table.

With the above structure, even if, when a new communication is established, a packet classification and an interrupt control method which correspond to the communication path are not registered in the interrupt management table, they can be registered according to instructions from the application program. Thereby, it is possible to perform proper interrupt control for each of a plurality of communication paths including the new communication path.

It is also possible that the setting unit is configured to (i) obtain communication path information as the instruction from the application program, and (ii) register, into the interrupt management table, the classification and the interrupt control method which correspond to the communication path information, the communication path information being used to specify a communication path established by the application program.

With the above structure, the interrupt control method corresponding to the communication path information is registered in the interrupt management table. As a result, it is possible to register an interrupt control method which is more proper for the communication path.

It is further possible that the setting unit is configured to register, into the interrupt management table, a first classification and a first interrupt control method in association with each other, and a second classification and a second interrupt control method in association with each other, and the interrupt control unit is configured to: when the classification of the packet classified by the classification unit is the first classification, output the interrupt signal to the processing unit by using the first interrupt control method associated with the first classification in the interrupt management table; and when the classification of the packet classified by the classification unit is the second classification, output the interrupt signal to the processing unit by using second interrupt control method associated with the second classification in the interrupt management table.

With the above structure, even in the circumstances where there are a packet of the first classification and a packet of the second classification which have different requirements of immediacy, an interrupt signal can be outputted by using a proper interrupt control method for each of them. Therefore, output occurrence frequencies of interrupt signals can be appropriately suppressed, in comparison with the situation of employing an interrupt control method by which an interrupt signal is immediately outputted for every packet of any classification. In addition, an interrupt control method can be switched depending on each packet classification. In more detail, the immediate interrupt method can be selected as an interrupt control method for packets requiring high immediacy. Or, if packets require low immediacy and receipt processing can be performed only once for a group of such packets, the timer interrupt method can be selected as an interrupt control method for such packets. Thereby, an optimum receipt control can be performed depending on a classification of each target packet.

Here, as an example, classification identifiers (Ring identifiers) are used as classifications by the classification unit to classify packets, and Descriptors are used by the transfer control unit to exchange packet data with the memory and the Descriptors are managed separately for respective classification identifiers. In this case, interrupt control can be performed using the same classifications as those used in the transfer control. Therefore, software controlling the communication processing apparatus can easily manage the interrupt control processing and the packet classification processing in association with each other. As a result, it is possible to suppress the increase of processing load such as re-determination of classification performed by software.

It is still further possible that the setting unit is configured to register, into the interrupt management table, at least one combination of the classification and the interrupt control method associated with the classification, and the interrupt control unit is configured to, when the at least one combination registered in the interrupt management table is a predetermined combination, output the interrupt signal by using a predetermined different interrupt control method, the predetermined different interrupt control method being different from the interrupt control method registered in the interrupt management table in association with the classification of the packet classified by the classification unit. For example, the interrupt control unit is configured to, when a delay interrupt method is only one interrupt control method registered in the interrupt management table, output the interrupt signal by using an immediate interrupt method, the delay interrupt method being for outputting the interrupt signal when a predetermined time period has passed since transfer of the data of the packet to the memory, and the immediate interrupt method being for outputting the interrupt signal immediately after the transfer of the data of the packet to the memory.

For example, as the interrupt control methods, the interrupt management table holds: (a) the timer interrupt method by which an interrupt signal is outputted for each predetermined time period; and (b) the delay interrupt method. In this case, software can prioritize processing for packets of a classification associated with the timer interrupt method, to processing for packets of a classification to associated with the delay interrupt. As a result, the software can appropriately execute processing for data of each of the packets. However, it is not necessary to delay outputting of interrupt signals even for the situation where only the delay interrupt method is registered as the interrupt control method in the interrupt management table. Therefore, according to the aspect of the present invention, if only the delay interrupt method is registered as the interrupt control method in the interrupt management table, interrupt signals are outputted by using not the registered delay interrupt method but an immediate interrupt method. As a result, it is possible to improve throughput for packets of a classification for which receipt processing is possible also by using the delay interrupt method.

It is still further possible that the setting unit is configured to resister, into the interrupt management table, as the interrupt control method, at least one of an immediate interrupt method, a delay interrupt method, a delay interrupt method with interval restriction, and a timer interrupt method, the immediate interrupt method being for outputting the interrupt signal immediately after transfer of the data of the packet to the memory, the delay interrupt method being for outputting the interrupt signal when a predetermined time period has passed since the transfer, the delay interrupt method with interval restriction being for outputting the interrupt signal when a predetermined time period has passed since the transfer and since outputting of an immediately-prior interrupt signal, and the timer interrupt method being for outputting the interrupt signal for each elapse of a predetermined time period.

With the above structure, it is possible to process packets for communication requiring immediacy, without delaying the processing, while suppressing output occurrence frequencies of interrupt signals. In addition, regarding the timer interrupt method, an accuracy of a timer time (several hundreds μsec or less) is higher than that of a timer function controlled by an OS. Therefore, the timer interrupt method can be regularly and appropriately performed even in receipt processing of large-amount High Definition (HD) video data. As a result, an accuracy of measures for Denial of Service (DoS) attacks can be increased. In addition, since the interrupt control unit outputs interrupt signals, the OS does not need to perform control as a timer function. Therefore, a timer function with a small software processing amount can be provided. Furthermore, if packets do not require immediacy and receipt processing can be performed only once for a group of such packets, it is possible to reduce software receipt processing load while suppressing output occurrence frequencies of interrupt signals. Moreover, in the delay interrupt method with interval restriction, the interrupt occurrence frequencies can be limited to be performed at predetermined intervals. As a result, processing load due to software can be more easily controlled. Here, it is possible to restrict an amount of receipt processing per one interrupt processed by the delay interrupt method with interval restriction. If so, the receipt amount restriction (pps restriction, bps restriction) can be easily achieved. Regarding the immediate interrupt method, receipt processing can be appropriately performed for packets requiring processing with high immediacy without sacrificing immediacy as the delay interrupt method with interval restriction does. If the immediate interrupt method, the delay interrupt method, the delay interrupt method with interval restriction, and the timer interrupt method are registered in the interrupt management table, it is possible to output an interrupt signal by employing an interrupt control method suitable for a target packet even if packets of various classifications are received at the same time.

It is still further possible that the transfer control unit is further configured to notify the interrupt control unit of packet-related information, the packet-related information being related to the packet classified by the classification unit, and the interrupt control unit is configured to, when the packet-related information is notified from the transfer control unit, (i) specify a different interrupt control method, and (ii) output the interrupt signal by using the different interrupt control method, the different interrupt control method corresponding to (a) the interrupt control method registered in the interrupt management table in association with the classification of the packet, and (b) the packet-related information.

For example, a length of received data, information for specifying a certain protocol, and the like are informed as the packet-related information to the interrupt control unit. Thereby, an interrupt control method is specified based on such packet-related information. As a result, an interrupt control method against DoS attack, for example, can be selected. Therefore, it is possible to easily deal with DoS attack. For example, against DoS attacks, it is possible to perform control not to affect original processing of a software application, while reducing a software processing amount by switching an interrupt control method, without destroying all received packets.

In accordance with another aspect of the present invention, there is provided a control method of controlling a communication processing apparatus which receives a packet, transfers data of the packet to a memory, and outputs an interrupt signal to a processing unit to process the data, wherein the communication processing apparatus, which holds an interrupt management table, receives a packet, transfers data of the packet to the memory, and outputs an interrupt signal for the packet by using an interrupt control method indicated in the interrupt management table in association with a classification of the packet received, the control method including: establishing a communication path to the communication processing apparatus; and transmitting, to the communication processing apparatus, communication path information for specifying the communication path, to cause the communication processing apparatus to register, into the interrupt management table, the classification of the packet and the interrupt control method which correspond to the communication path information, so as to update the interrupt management table.

With the above structure, a type of a packet and an interrupt control method which correspond to a communication path established by an application program is registered into the interrupt management table. Thereby, the communication processing apparatus can appropriately output interrupt signals depending on processing of the application program.

It is possible that the interrupt signal is outputted due to a receipt interrupt cause or a timer interrupt cause, the receipt interrupt cause being the transfer of the data of the packet to the memory, and the timer interrupt cause being elapse of a predetermined time period, the control method further including: (i) obtaining the interrupt signal, and (ii) determining whether or not the obtained interrupt signal is outputted due to the receipt interrupt cause or the timer interrupt cause; processing the data by using a first receipt processing method, when the determination is made that the interrupt signal is outputted due to the receipt interrupt cause, the data having being transferred to the memory; and processing the data by using a second receipt processing method different from the first receipt processing method, when the determination is made that the interrupt signal is outputted due to the timer interrupt cause, the data having being transferred to the memory.

With the above structure, based on whether outputting of an interrupt signal is caused by the receipt interrupt cause or the timer interrupt cause, it is possible to switch a receipt processing method for data transferred to the memory between the first receipt processing method and the second receipt processing method. As a result, receipt processing can be performed appropriately for each of the causes.

It is also possible that the interrupt management table registers a timer interrupt method as the interrupt control method, the timer interrupt method being for outputting the interrupt signal for each elapse of a predetermined time period, the control method further including: when the data transferred to the memory is processed by using the second receipt processing method, determining whether or not to restrict processing for a group of pieces of data of packets, the pieces of data having being transferred to the memory, and the pieces of data being to be processed by the timer interrupt method; processing all of the pieces of data of the packets in the group, when the determination is made not to restrict the processing; and processing only a part of the all of the pieces of data of the packets in the group, when the determination is made to restrict the processing, the part being no more than a predetermined number of packets.

There are different types among packets for which interrupt signals are outputted due to the timer interrupt cause. For example, like packets in a stream, some of them require assurance of a wide bandwidth in receiving. In addition, like packets downloaded with a large amount of data, others do not require such assurance but have a large amount of data to be received and processed. If there are such different types of packets in the memory, all of the packets in a stream (their data have been transferred to the memory) should be processed by one interrupt. On the other hand, the large-amount downloaded packets should be restricted on a data amount processed by one interrupt, so that the stream packets can be appropriately processed. Therefore, according to the aspect of the present invention, a determination is made as to whether or not the processing is to be restricted as described above, for example. If it is determined that the processing is not to be restricted, data of all of the packets are processed. On the other hand, if it is determined that the processing is to be restricted, data of only packets no more than a predetermined number among them are processed. Therefore, according to the aspect of the present invention, in packet receipt processing where a receiving bandwidth of video stream receipt or the like significantly affects quality of an application, its receiving bandwidth can be assured steady even if other packets are also received.

It is further possible that the interrupt management table registers an immediate interrupt method and a delay interrupt method each of which is the interrupt control method, the immediate interrupt method being for outputting the interrupt signal immediately after the transfer of the data of the packet to the memory, and the delay interrupt method being for outputting the interrupt signal when a predetermined time period has passed since the transfer of the data of the packet to the memory, the control method further including: when the data transferred to the memory is processed by using the first receipt processing method, determining, by the processing unit based on classifications of packets having pieces of data in a group, whether or not the pieces of data of the packets in the group are to be processed by the immediate interrupt method or by the delay interrupt method, the pieces of data having being transferred to the memory; processing all of the pieces of data of the packets in the group, when the determination is made that the pieces of data are to be processed by the immediate interrupt method; and processing only a part of the all of the pieces of data of the group of the packets, when the determination is made that the pieces of data are to be processed by the delay interrupt method, the part being no more than a predetermined number of packets.

There are different types among packets for which interrupt signals are outputted due to the timer interrupt cause. For example, like packets in Acknowledgment (ACK) processing of TCP, some of them require immediacy. In addition, like packets in web browsing, others do not require assurance of a bandwidth in receiving. If there are such different types of packets in the memory, all of the ACK-processing packets (their data have been transferred to the memory) should be processed by one interrupt. On the other hand, the web-browsing packets should be restricted on a data amount processed by one interrupt, so that the ACK-processing packets can be appropriately processed. Therefore, according to the aspect of the present invention, a determination is made as to whether a group of data of packets transferred to the memory is to be processed by the immediate interrupt method or by the delay interrupt method. If it is determined that the group is to be processed by the immediate interrupt method, data of all of the packets in the group are processed. On the other hand, if it is determined that the group is to be processed by the delay interrupt method, data of only packets no more than a predetermined number in the group are processed. Therefore, according to the aspect of the present invention, in receipt processing of packets, such as ACK-processing packets, requiring immediacy receiving packets, the immediacy can be assured even if other packets are also received.

It is still further possible that the interrupt management table registers a delay interrupt method as the interrupt control method, the delay interrupt method being for outputting the interrupt signal when a predetermined time period has passed since the transfer of the data of the packet to the memory, the control method further including: when the data transferred to the memory is processed by using the first receipt processing method, determining whether or not only the delay interrupt method is registered as the interrupt control method in the interrupt management table; processing all of pieces of data of packets, when the determination is made that only the delay interrupt method is registered as the interrupt control method in the interrupt management table, the pieces of data having being transferred to the memory; and processing only a part of the all of the pieces of data of the packets, when the determination is made that not only the delay interrupt method but also an other interrupt control method are registered in the interrupt management table, the pieces of data having being transferred to the memory, the pieces of data being to be processed by the delay interrupt method, and the part being no more than a predetermined number of packets.

With the above structure, if not only the delay interrupt method but also a different interrupt control method (for example, the timer interrupt method) are registered in the interrupt management table, data of only packets no more than a predetermined number among all packets with data transferred to the memory and to be processed by the delay interrupt method is processed. Thereby, the packet data to be processed by the delay interrupt method can be processed not to trouble the processing for packet data to be processed by the timer interrupt method. Moreover, if only the delay interrupt method is registered in the interrupt management table, data of all packets, which have been transferred to the memory, is processed. As a result, it is possible to improve throughput of receipt processing for packets to be processed by the delay interrupt method.

It should be noted that the present invention can be implemented not only as the communication processing apparatus and the control method of controlling the communication processing apparatus, but also as: a communication device including the communication processing apparatus to control the communication processing apparatus using the control method; a method used in the communication processing apparatus for communicating; a program causing a computer to control the communication processing apparatus; a recording medium on which the program is recorded; an integrated circuit; and the like.

Effects of the Invention

An object of the present invention is to provide a communication processing apparatus capable of performing interrupt properly according to application processing while suppressing a receipt processing load of software, and a communication device including the communication processing apparatus.

(Further Information about Technical Background to This Application)

The disclosure of Japanese Patent Application No. 2008-130285 filed on May 19, 2008 including specification, drawings and claims is incorporated herein by reference in its entirety.

BRIEF DESCRIPTION OF DRAWINGS

FIG. 3 is a table of an example of a classification table according to the embodiment of the present invention.

FIG. 4 is an example of an interrupt management table according to the embodiment of the present invention.

FIG. 5 is another example of the interrupt management table according to the embodiment of the present invention.

FIG. 6A is a chart of a timing of an immediate interrupt according to the embodiment of the present invention.

FIG. 6B is a chart of a timing of a delay interrupt according to the embodiment of the present invention.

FIG. 6C is a chart of timings of delay interrupts with interval restriction according to the embodiment of the present invention.

BEST MODE FOR CARRYING OUT THE INVENTION

The following describes an embodiment of the present invention with reference to the drawings.

Figure 1:
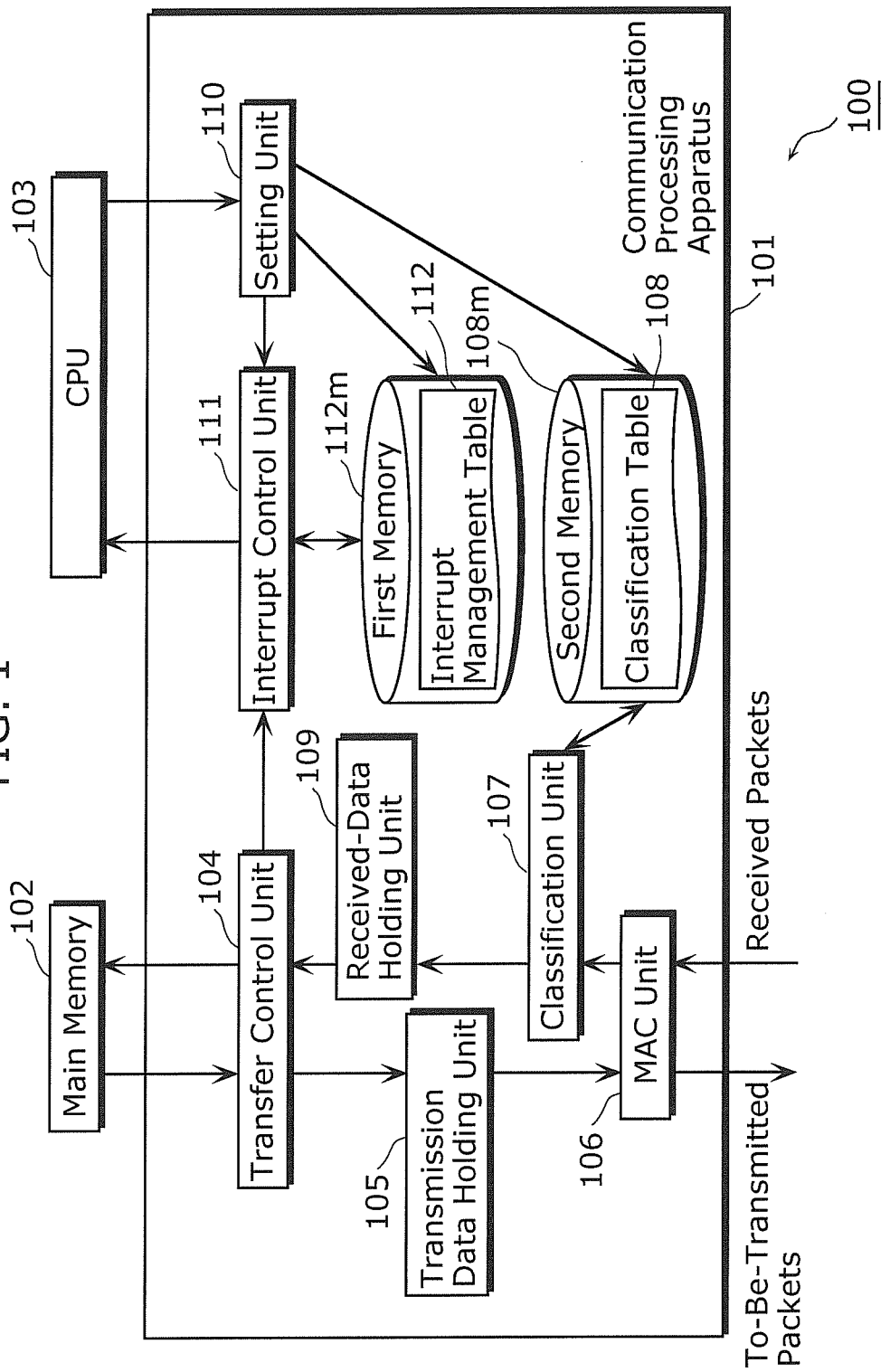
FIG. 1 is a block diagram illustrating a structure of a communication device and a communication processing apparatus according to an embodiment of the present invention.

FIG. 1 is a block diagram illustrating a structure of a communication device and a communication processing apparatus according to the embodiment of the present invention.

The communication device 100 according to the present invention includes a communication processing apparatus 101, a main memory 102, and a CPU 103. Here, in FIG. 1, a system bus connected to each of the above structural elements in the communication device 100 is not illustrated for the sake of simplicity of the description and not related to the essence of the present invention. Furthermore, although FIG. 1 illustrates only one for each of the main memory 102 and the CPU 103, it is also possible that there are physically or logically a plurality of the main memories 102 and a plurality of the CPUs 103. The number of them is not related to the essence of the present invention.

The communication processing apparatus 101 includes a transfer control unit 104, a transmission data holding unit 105, a MAC unit 106, a classification unit 107, a second memory 108m, a received-data holding unit 109, a setting unit 110, an interrupt control unit 111, and a first memory 112m.

In transmission processing, the transfer control unit 104 transfers data of a to-be-transmitted packet to the transmission data holding unit 105, managing and controlling packet data transfer between the communication processing apparatus 101 and the main memory 102. Furthermore, for receipt processing, the transfer control unit 104 transfers data of a received packet from the received-data holding unit 109 to the main memory 102.

The transmission data holding unit 105 transfers the data of the to-be-transmitted packet transferred from the transfer control unit 104, to the MAC unit 106. The MAC unit 106 transmits data of the to-be-transmitted packet transferred from the transmission data holding unit 105, by transmission processing compliant with a predetermined MAC standard. In addition, the MAC unit 106 receives the packet by receipt processing compliant with the predetermined MAC standard, and then transfers data of the received packet to the classification unit 107. Here, external blocks connected with the MAC unit 106 depend on a physical layer. They are interfaces (I/F) connected to a network connected to the communication device 100.

The classification unit 107 classifies the data of the received packet transferred from the MAC unit 106 with reference to the classification table 108 stored in the second memory 108m, and thereby transfers the data together with a classification identifier to the received-data holding unit 109. The received-data holding unit 109 holds the data of the received packet transferred from the classification unit 107 and the classification identifier in association with each other. Here, the classification identifier is the result of the classification performed by the classification unit 107, and is allocated to the data of the received packet depending on details of the data.

The classification unit 107 and the classification table 108 are not related to the essence of the present invention. However, they are useful to understand the classification identifiers in the interrupt management table 112. Therefore, the classification unit 107 and the classification table 108 are described in detail below.

Figure 2:
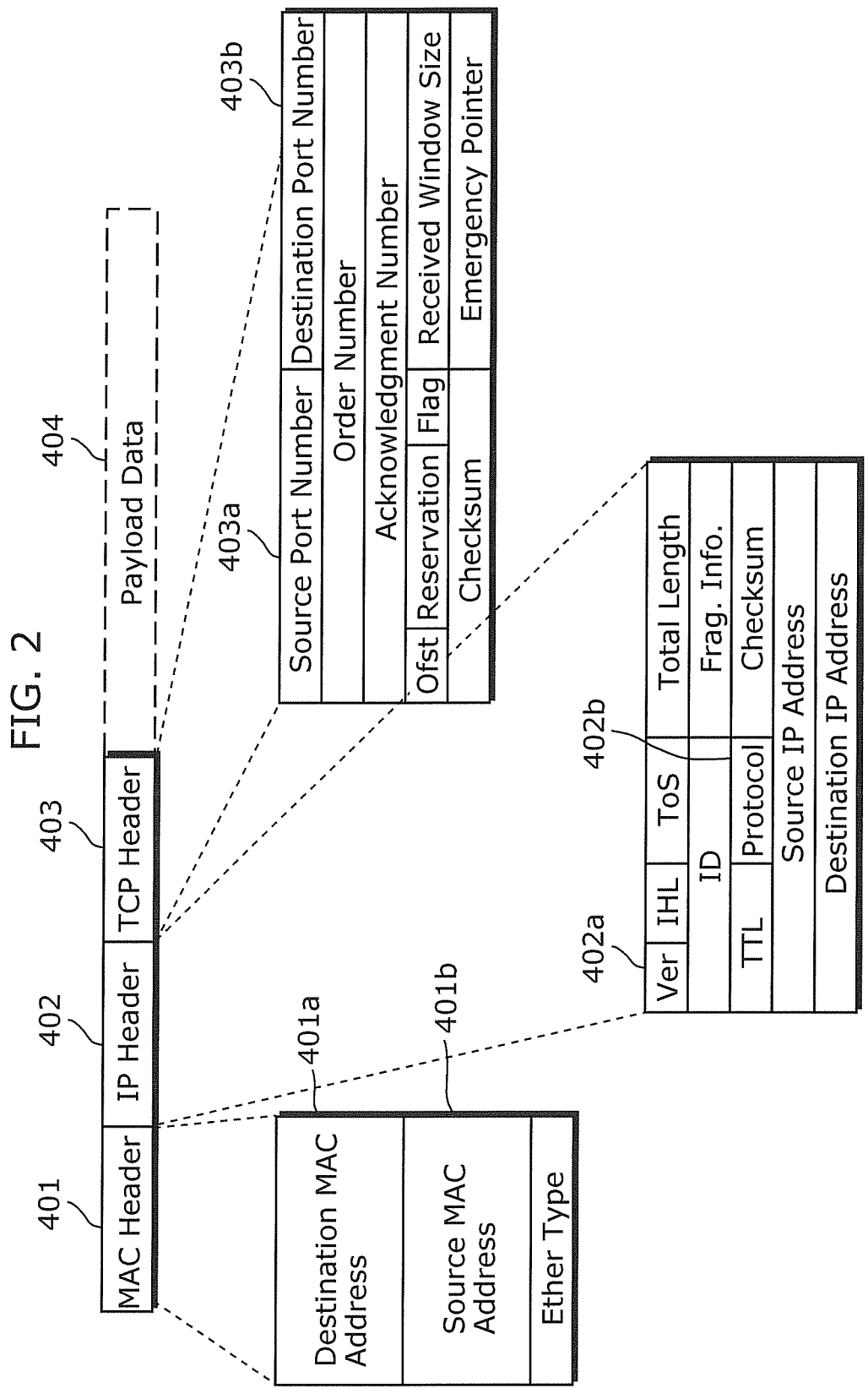
FIG. 2 is a diagram illustrating a format example of a received packet handled by a classification unit according to the embodiment of the present invention.

FIG. 2 is a diagram illustrating a format example of a received packet handled by the classification unit 107. More specifically, FIG. 2 illustrates a format example in the situation where a MAC is Ethernet™, a network layer is IP, and a transport layer is TCP. It should be noted that it is described in the embodiment that the format of a received packet handled by the classification unit 107 employs the MAC, the network layer, the transport layer, and the like, but the format may employ others.

For example, data of a received packet includes a MAC header 401, an IP header 402, a TCP header 403, and a payload header 404. In this case, examples of the information used to classify a received packet are: a destination MAC address 401a or a source MAC address 401b which is included in a MAC header 401; an IP version (Vr) 402a or a transport protocol number 402b which is included in an IP header; a source port number 403a or a destination port number 403b which is included in a TCP header 403. It is possible to use a part of them and arbitrarily use the others, or to use all of them. Moreover, other information included in data of a received packet may be used for classification. For example, in the situation where the Protocol 402b indicates TCP (0x06) and the source port number 403a indicates 80, it is possible to specify the received packet as a received packet transmitted from a HTTP server. Furthermore, the destination port number 403b makes it possible to specify an application handling the received packet. The communication device 100 receiving the packet can uniquely specify whether or not the received packet is to be used for video communication.

FIG. 3 illustrates an example of the classification table 108.

For example, the classification table 108 indicates classification parameters that are information to be used to classify received packets, and classification identifiers associated with the respective classification parameters. In this example, one classification parameter includes a transport protocol, a destination IP address, a source port number, and a destination port number. The transport protocol may be the above-described transport protocol number.

In more detail, the classification table 108 holds a classification identifier "1" in association with a classification parameter "Protocol: TCP, Destination IP Address: 192.168.3.4, Source Port Number: 80, Destination Port Number: 10001", and a classification identifier "2" in association with a classification parameter "Protocol: TCP, Destination IP Address: 192.168.1.8 Source Port Number: 10001, Destination Port Number: 10002." The classification table 108 indicates classification identifiers "Default" for classification parameters except the above classification parameters.

Therefore, the classification unit 107 searches the classification table 108 for a classification parameter indicated in data of a received packet. If the classification parameter exists in the classification table 108, the classification unit 107 provides the received-data holding unit 109 with a classification identifier associated with the classification parameter together with the data of the received packet. In addition, if the search results in that the classification parameter does not exist in the classification table 108, the classification unit 107 provides the received-data holding unit 109 with the classification identifier "Default" together with the data of the received packet.

As described above, in the classification table 108, definition (classification parameters) for classifying received packets are registered in association with respective corresponding classification identifiers. In order to distinguish each entry of the definition, the definition may be virtually associated with a classification identifier for the sake of convenience.

For receipt processing, the transfer control unit 104 transfers the data of the received packet which is held in the received-data holding unit 109 to the main memory 102 based on the classification identifier associated with the data. Here, the transfer control unit 104 notifies the interrupt control unit 111 of the fact that the data of the received packet has been outputted to the main memory 102 as well as of the classification identifier.

The interrupt control unit 111 searches the interrupt management table 112 stored in the first memory 112m for the classification identifier notified from the transfer control unit 104. Thereby, the interrupt control unit 111 specifies an interrupt control method defined in a traffic type associated with the classification identifier, and performs interrupt control using the method. As a result, the interrupt control unit 111 outputs interrupt signals at necessary timings to the CPU 103.

FIG. 4 illustrates an example of the interrupt management table 112.

For example, the interrupt management table 112 indicates classification identifiers and traffic types associated with the respective classification identifier. In other words, the interrupt management table 112 registers a classification identifier and a traffic type in association with each other. Furthermore, classification identifiers in the interrupt management table 112 are the same as those in the classification table 108.

More specifically, the interrupt management table 112 indicates a traffic type "stream" in association with the classification identifier "1", and also indicates a traffic type "immediate" in association with the classification identifier "2". Here, the traffic type is a receiving form of received packets. For example, the traffic type is one of "non-preferred", "immediate", "stream", and "download". The traffic type "non-preferred" is a common receiving form that does not require assurance of a bandwidth. The traffic type "immediate" is a receiving form that requires immediate processing such as TCP-ACK processing useful for TCP throughput improvement. The traffic type "stream" is a receiving form for video data which requires assurance of a bandwidth. The traffic type "download" is a receiving form that requires maximum receiving performance without interfering communication by "stream".

In other words, the interrupt control unit 111 searches the interrupt management table 112 for the classification identifier (for example, the classification identifier "1") notified from the transfer control unit 104, and thereby specifies a traffic type (for example, "stream") associated with the classification identifier. In addition, the interrupt control unit 111 specifies an interrupt control method defined by the specified traffic type.

For example, for the traffic type "non-preferred", an interrupt control method "delay interrupt" or "delay interrupt with interval restriction" is defined. For the traffic type "immediate", an interrupt control method "immediate interrupt" is defined. For the traffic type "stream", an interrupt control method "timer interrupt" is defined. For the traffic type "download", an interrupt control method "timer interrupt with processing amount (bandwidth) restriction" is defined. Here, the traffic type "non-preferred" may be segmented into a traffic type "non-preferred A" for which the interrupt control method "delay interrupt" is defined, and a traffic type "non-preferred B" for which the interrupt control method "delay interrupt with interval restriction" is defined.

The "immediate interrupt" is an interrupt control method for outputting an interrupt signal, immediately after transfer of packet data to the main memory 102. The "delay interrupt" is an interrupt control method for outputting an interrupt signal when a predetermined time period has passed after transfer of packet data to the main memory 102. The "delay interrupt with interval restriction" is an interrupt control method for outputting an interrupt signal, when a predetermined time period has passed after transfer of packet data to the main memory 102 and also after outputting of an immediately-prior interrupt signal. The "timer interrupt" is an interrupt control method for outputting an interrupt signal every time a predetermined period has passed. The "timer interrupt with processing amount (bandwidth) restriction" is an interrupt control method for outputting an interrupt signal at the same timing of that of the above-mentioned "timer interrupt" but with restriction on an amount of processed data depending on the interrupt signal.

According to the embodiment, in the interrupt management table 112, a traffic type is registered in association with a classification identifier, and one traffic type is defined for one interrupt control method. Thereby, the interrupt management table 112 according to the embodiment indicates an interrupt control method associated with a classification identifier, indirectly via a traffic type. Therefore, the interrupt management table 112 may register an interrupt control method instead of a traffic type, in association with a classification identifier.

It should be noted that in the embodiment the communication processing apparatus 101 holds the interrupt management table 112 and the classification table 108 separately, but the communication processing apparatus 101 may hold a single table including information included in these table, instead of the two tables.

FIG. 5 illustrates another example of the interrupt management table 112.

The interrupt management table 112 indicates: a classification identifier; a classification parameter associated with the classification identifier; and a traffic type associated with the classification identifier and the classification parameter.

When the communication processing apparatus 101 has the interrupt management table 112 illustrated in FIG. 5, the communication processing apparatus 101 does not have the second memory 108m but the first memory 112m storing the interrupt management table 112. In the above case, the classification unit 107 classifies received packets with reference to the interrupt management table 112 instead of the classification table 108.

Here, even if the communication processing apparatus 101 has the interrupt management table 112 and the classification table 108 separately, the communication processing apparatus 101 may have the interrupt management table 112 illustrated in FIG. 5. In the above case, the interrupt management table 112 illustrated in FIG. 5 may not indicate classification identifiers. More specifically, it is possible that the interrupt management table 112 indicates the classification parameters and the traffic types in association with each other. If such a interrupt management table 112 is stored in the first memory 112m, the classification unit 107 transfers data of a received packet together with its classification parameter to the received-data holding unit 109, and the transfer control unit 104 notifies the to interrupt control unit 111 of the fact that the data of the received packet has been transferred to the main memory 102, as well as of the classification parameter. Then, the interrupt control unit 111 searches the interrupt management table 112 for a traffic type associated with the classification parameter, and thereby specifies an interrupt control method associated with the traffic type.

Here, the interrupt control methods employed in the interrupt control unit 111 are described in detail below.

The employed interrupt control method is at least one of the followings.
(1) immediate interrupt
(2) delay interrupt (without interval restriction)
(3) delay interrupt with interval restriction
(4) timer interrupt (with processing amount restriction, or without processing amount restriction)

It should be noted that the timer interrupt among the above interrupt control methods is not necessarily defined in the interrupt management table 112. The time interrupt may be defined simply as "no interrupt caused by receipt".

The timer interrupt is a function which the interrupt control unit 111 in the communication processing apparatus 101 has. The timer interrupt is an interrupt control method of outputting an interrupt signal in a predetermined cycle (timer timing) to the CPU 103. More specifically, if the "timer interrupt" is employed as an interrupt control method, the interrupt control unit 111, which has a timer function, outputs cyclic interrupt signals based on timer timings set by the CPU 103 via the setting unit 110, or based on predetermined timer timings. Here, it is also possible that the interrupt control unit 111 receives, via the setting unit 110, information of ON/OF of the timer interrupt designated by the CPU 103, and thereby operates or stops outputting of the cyclic interrupt signals.

The timer interrupt can perform the outputting in cycles with an accuracy determined according to an operation clock of the interrupt control unit 111. However, it is not necessary to set the cycles of the operation clock to be minimum units. In general, interrupt processing performed by a driver of software for interrupt is driven with a lag of about several dozens μsec at most. Therefore, the timer interrupt has an accuracy higher than that of a timer function which an OS has. As a result, a timer function that reduces a processing amount of software can be offered. It is possible that a plurality of the timer interrupt methods are employed. However, this can be also achieved if a single timer interrupt method with a short unit time (timer timing) is employed to perform control by software as if a plurality of timers are virtually used.

In more detail, timings of the immediate interrupt, the delay interrupt, and the delay interrupt with interval restriction are described with reference to FIGS. 6A to 6C.

FIG. 6A is a chart of a timing of the interrupt control method "immediate interrupt".

The immediate interrupt is an interrupt control method by which the interrupt control unit 111 outputs an interrupt signal immediately after the transfer control unit 104 in the communication processing apparatus 101 completes transfer (occurrence of a receiving event). It should be noted that the expression "immediate" is for the sake of convenience of the description. Occurrence of a few-clock lag in the operation clock units of actual hardware is acceptable, and the expression "immediate" does not limit the lag.

FIG. 6B is a chart of a timing of the interrupt control method "delay interrupt (without interval restriction)".

The delay interrupt is an interrupt control method by which the interrupt control unit 111 outputs an interrupt signal when a predetermined time period (delay time t) has passed since completion of transfer (occurrence of a receiving event) of the transfer control unit 104 in the communication processing apparatus 101. The above-mentioned delay time t may be registered in an entry defined by a corresponding classification identifier "Default" in the interrupt management table 112. Furthermore, the above-mentioned delay time t may be previously designated in the interrupt control unit 111 by using the setting unit 110. Moreover, the above-mentioned delay time t may be previously stored in the interrupt control unit 111. If, during a period from occurrence of a receiving event to outputting of an interrupt signal for the receiving event, a new receiving event occurs, an interrupt signal is outputted with a delay of the above-described delay time t from the new receiving event occurrence, as far as the software does not regard the new receiving event occurrence as out of management of the transfer control unit 104 in the communication processing apparatus 101.

It should be noted that an accuracy of the delay time t for interrupt does not limit a few-clock lag of an operation clock of the software, as described earlier for the immediate interrupt. Meanwhile, it is not recommended to entry the above-described delay time t individually in an entry in the interrupt management table 112, because it complicates the structure.

FIG. 6C is a chart of timings of the interrupt control method "delay interrupt with interval restriction".

The delay interrupt with interval restriction is an interrupt control method by which the interrupt control unit 111 outputs an interrupt signal when a predetermined time period (delay time t) has passed since completion of transfer (occurrence of a receiving event) of the transfer control unit 104 in the communication processing apparatus 101. The delay interrupt with interval restriction differs from the delay interrupt without interval restriction in that it is assured that a time interval between an interrupt signal and its next interrupt signal is longer than the delay time t. More specifically, if, during a period from occurrence of a receiving event and to outputting of an interrupt signal for the receiving event occurrence, a new receiving event occurs and the software does not regard the new receiving event occurrence as out of management of the transfer control unit 104 in the communication processing apparatus 101, the interrupt control unit 111 outputs a new interrupt signal with an interval of the delay time t from the outputting of the previous interrupt signal. For example, as illustrated in FIG. 6C, if, during a period from occurrence of a receiving event a and to outputting of an interrupt signal a for the occurrence of the receiving event a, a new receiving event b occurs, the interrupt control unit 111 outputs a new interrupt signal b with an interval of the delay time t from the outputting of the previous interrupt signal a.

This interrupt control method facilitates software implementation for restriction on Packet Per Sec (pps: the number of packets processed in each unit time) or restriction on Bit Per Sec (bps: an amount of received data processed in each unit time). In addition, the interrupt control method can suppress outputting of unnecessary interrupt signals.

The setting unit 110 updates the interrupt management table 112 and the classification table 108. More specifically, when the CPU 103 activates an application, the setting unit 110 updates the interrupt management table 112 and the classification table 108 according to a communication path established by the application.

Figure 7:
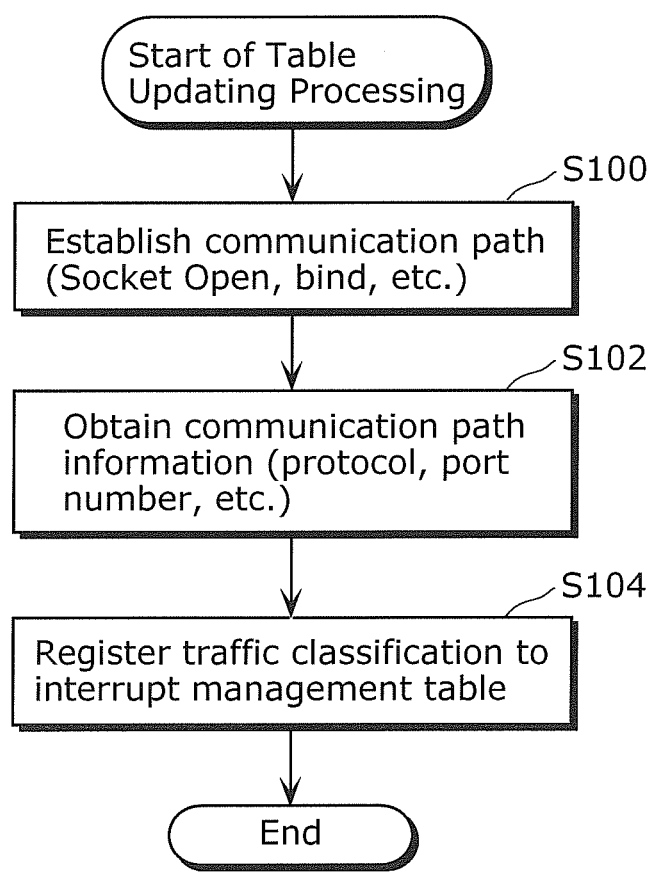
FIG. 7 is a flowchart of an example of table updating processing performed by an application and a setting unit according to the embodiment of the present invention.

FIG. 7 is a flowchart of an example of table updating processing performed by an application and the setting unit 110.

First, an application establishes a communication path (Step S100). For example, the application opens a socket or performs bind. The setting unit 110 obtains information of the communication path (hereinafter, communication path information) from the application that has established the communication path (Step S102). The communication path information is a classification parameter in the classification table 108 illustrated in FIG. 3. The communication path information includes a Protocol, a destination IP address, a source port number, a destination port number, and the like.

Next, the setting unit 110 allocates a classification identifier to the obtained communication path information, and registers the communication path information as a classification parameter together with the classification identifier to the classification table 108. Furthermore, the setting unit 110 specifies a traffic type suitable for the obtained communication path information, and registers, in the interrupt management table 112, the specified traffic type in association with the classification identifier allocated to the communication path information (Step S104). Here, if the application program establishes a communication path but a classification identifier and an interrupt control method which are associated with the communication path are not registered in the interrupt management table 112, the classification identifier and the interrupt control method are added to the interrupt management table 112 at Step S104.

As described above, the application program establishes a communication path to the communication processing apparatus 101 and outputs the communication path information to the communication processing apparatus 101. Thereby, the application program causes the setting unit 110 in the communication processing apparatus 101 to register, in the interrupt management table 112, a classification identifier and an interrupt control method in association with the communication path information. As a result, the interrupt management table 112 is updated.

It is also possible that the setting unit 110 receives, from the CPU 103, a request for ON/OFF of the timer interrupt performed by the interrupt control unit 111, and causes the interrupt control unit to execute or stop the timer interrupt according to the request.

It is also possible that a piece of communication path information registered in the interrupt management table 112 and the classification table 108 is applicable for a plurality of communication paths having the same predetermined communication path information. This makes it possible to refer to the same registration information for communication paths having the same values as port numbers well known in servers, for example. As a result, the number of pieces of registration information in the interrupt management table 112 and the classification table 108 can be reduced.

Next, an example of algorithms for achieving the interrupt control methods is described with reference to FIGS. 8 to 13. The following description is given for hardware implementation where sequential processing is performed even if parallel processing is possible, for the sake of simplicity of the description. However, the description does not eliminate parallel processing. In addition, the following description is given for the aspect where all of the above-described interrupt control methods are implemented. However, since the ordinary person skilled in the art can easily suggest the situation where a part of the interrupt control methods is not implemented, such a situation is not described.

Figure 8:
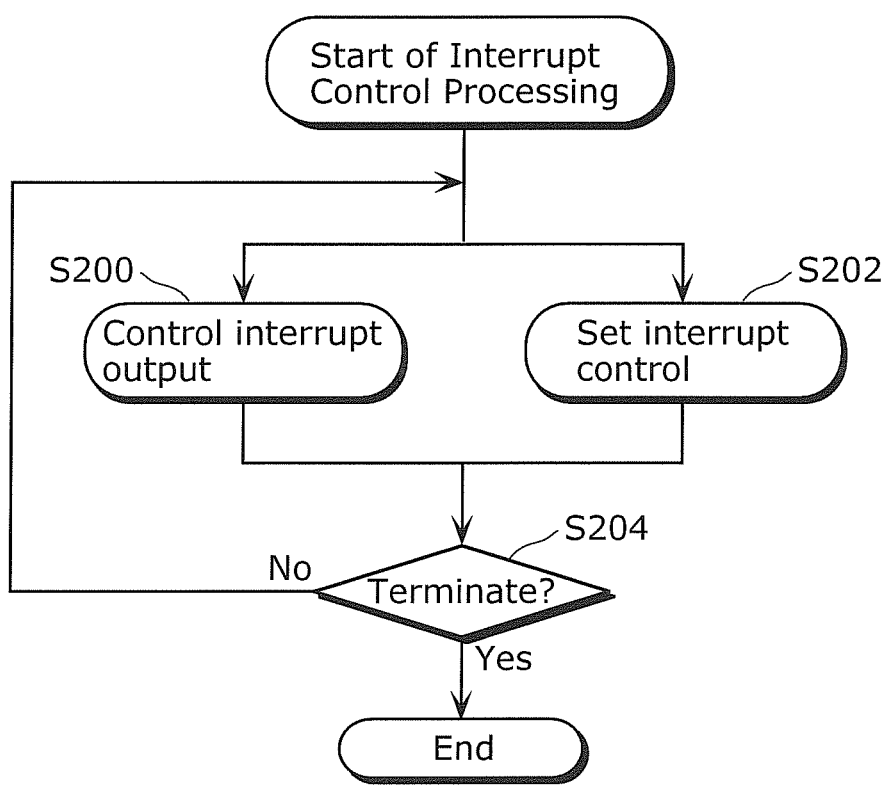
FIG. 8 is a flowchart of interrupt control processing that is an overall processing performed by the interrupt control unit according to the embodiment of the present invention.

FIG. 8 is a flowchart of interrupt control processing that is an overall processing performed by the interrupt control unit 111. For performing interrupt control processing, the interrupt control unit 111 performs the interrupt output control (Step S200) and interrupt control setting (Step S202) in parallel, or performs one of them. Then, the interrupt control unit 111 determines whether or not the interrupt control processing is to be terminated (Step S204). If the interrupt control unit 111 determines that the interrupt control processing is not to be terminated (No at Step S204), then the interrupt control unit 111 repeats the Steps S200 and S202. On the other hand, if the interrupt control unit 111 determines that the interrupt control processing is to be terminated (Yes at Step S204), then the interrupt control unit 111 terminates the interrupt control processing.

Figure 9:
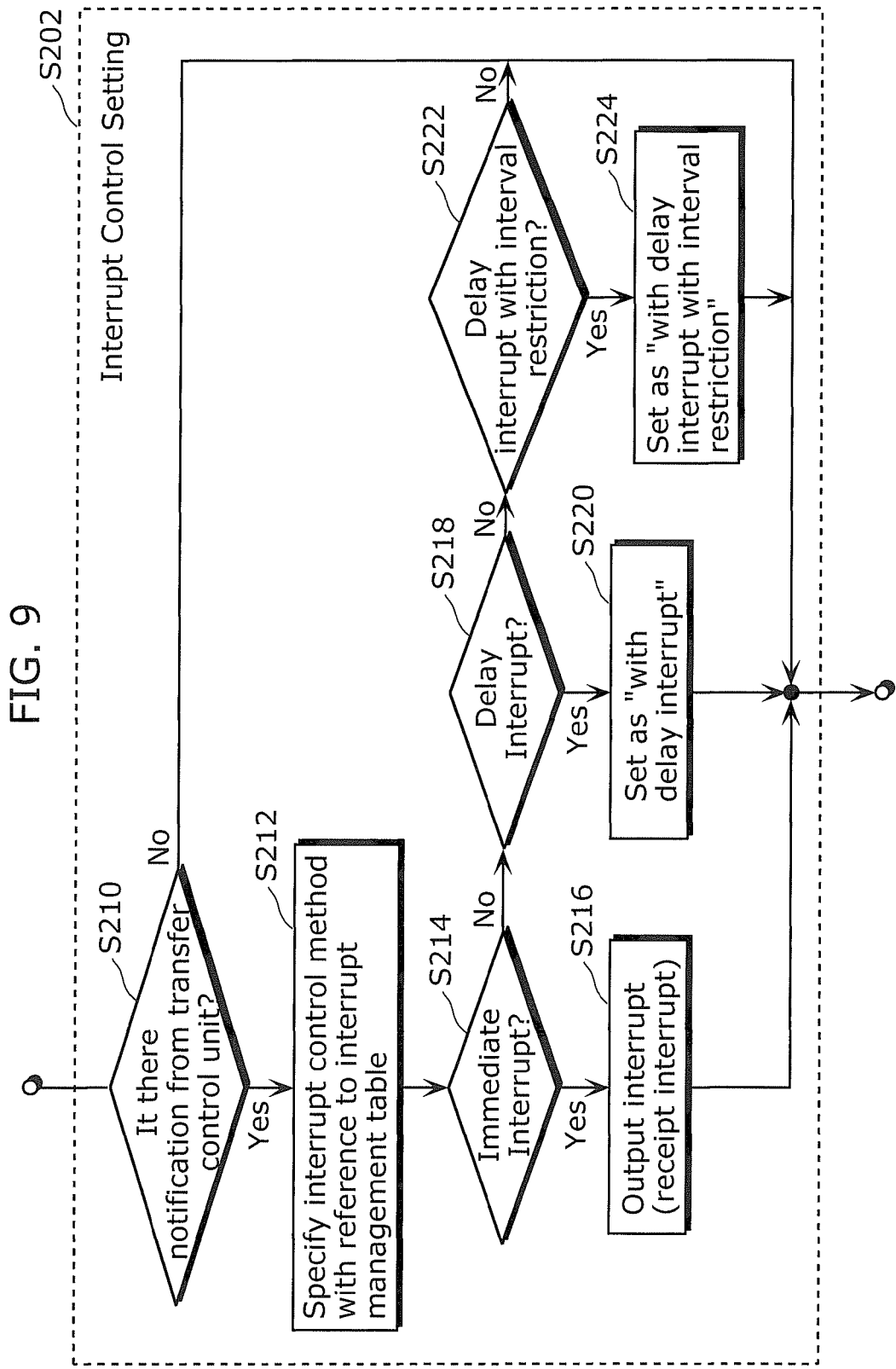
FIG. 9 is a flowchart of details of interrupt control setting executed in the interrupt control processing performed by the interrupt control unit according to the embodiment of the present invention.

FIG. 9 is a flowchart of details of the interrupt control setting described as the Step S202 in FIG. 8.

For the interrupt control setting, the interrupt control unit 111 first determines whether or not the interrupt control unit 111 receives notification of receiving completion from the transfer control unit 104 (Step S210). If it is determined that the notification is not received (No at Step S210), then the interrupt control unit 111 terminates the interrupt control setting. On the other hand, if it is determined that the notification is received (Yes at Step S210), then the interrupt control unit 111 searches the interrupt management table 112 for a traffic type associated with a classification identifier obtained from the transfer control unit 104. Then, the interrupt control unit 111 searches out the traffic type, and specifies an interrupt control method defined for the traffic type (Step S212).

Next, the interrupt control unit 111 determines whether or not the interrupt control method specified at Step S212 is immediate interrupt (Step S214). If it is determined that the interrupt control method is immediate interrupt (Yes at Step S214), then the interrupt control unit 111 sets an interrupt occurred by receipt of a packet (hereinafter, "receipt interrupt") as a cause of an interrupt (hereafter, "interrupt cause"), then outputs an interrupt signal (Step S216), and completes the interrupt control setting. On the other hand, if it is determined that the interrupt control method is not immediate interrupt (No at Step S214), then the interrupt control unit 111 further determines whether or not the interrupt control method is delay interrupt (without interval restriction) (Step S218).

If it is determined that the interrupt control method is delay interrupt (Yes at Step S218), then the interrupt control unit 111 sets "with delay interrupt" for occurrence of a receiving event (Step S220), and completes the interrupt control setting. On the other hand, if it is determined at Step S218 that the interrupt control method is not delay interrupt (No at Step S218), then the interrupt control unit 111 further determines whether or not the interrupt control method is delay interrupt with interval restriction (Step S222).

If it is determined that the interrupt control method is delay interrupt with interval restriction (Yes at Step S222), then the interrupt control unit 111 sets "with delay interrupt with interval restriction" for occurrence of a receiving event (Step S224), and completes the interrupt control setting. On the other hand, if it is determined at Step S222 that the interrupt control method is not delay interrupt with interval restriction (No at Step S222), then the interrupt control unit 111 terminates the interrupt control setting without performing the Step S224. As a result, data indicating completion of receiving is handled to be processed by timer interrupt.

Figure 10:
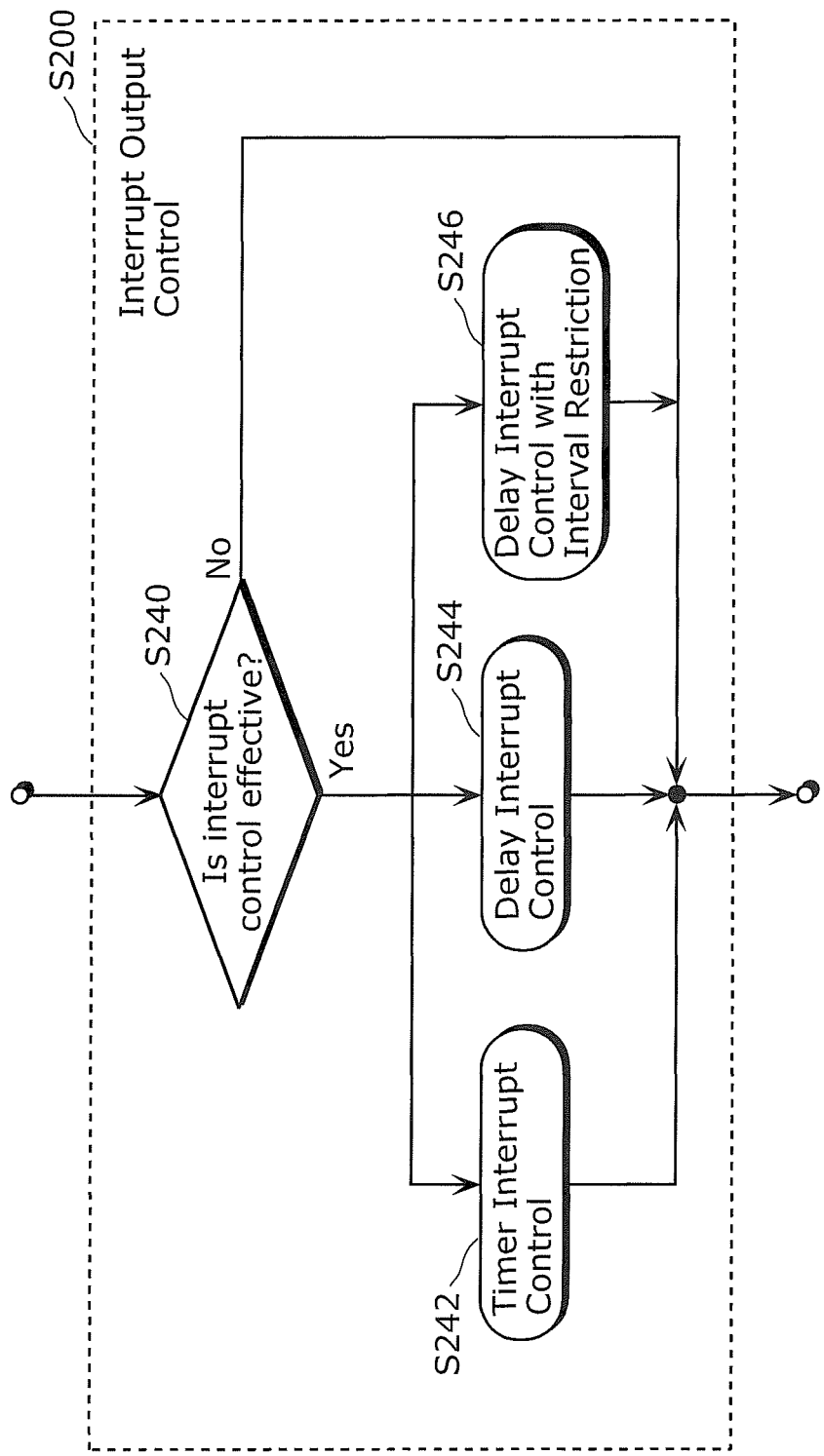
FIG. 10 is a flowchart of details of interrupt output control executed in the interrupt control processing performed by the interrupt control unit according to the embodiment of the present invention.

FIG. 10 is a flowchart of details of the interrupt output control described as the Step S200 in FIG. 8

For the interrupt output control, the interrupt control unit 111 first determines whether or not interrupt control is possible (Step S240). For example, if the interrupt management table 112 is stored in the first memory 112m, the interrupt control unit 111 determines that the interrupt control is possible. Or, the interrupt control unit 111 determines that the interrupt control is possible, when the interrupt control unit 111 determines with reference to the interrupt management table 112 that the interrupt management table 112 holds classification identifiers and their traffic types.

If it is determined that the interrupt control is possible (Yes at Step S240), then the interrupt control unit 111 performs one of timer interrupt control (Step S242), delay interrupt control (Step S244), and delay interrupt control with interval restriction (Step S246), and then completes the interrupt output control. On the other hand, if it is determined at Step S240 that the interrupt control is not possible (No at Step S240), then the interrupt control unit 111 terminates the interrupt output control without performing any one of the above steps S242, S244, and S246.

Figure 11:
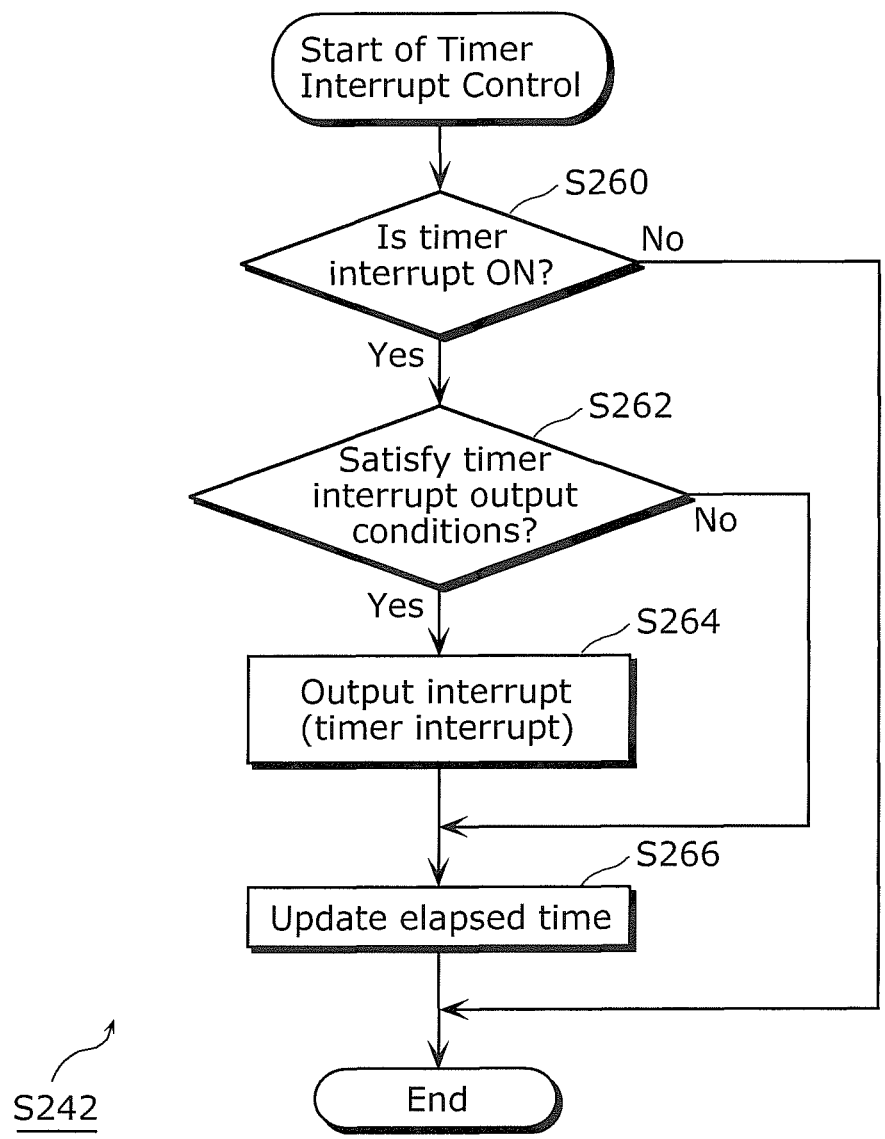
FIG. 11 is a flowchart of details of timer interrupt control executed in the interrupt output control performed by the interrupt control unit according to the embodiment of the present invention.

FIG. 11 is a flowchart of details of the timer interrupt control described as the Step S242 in FIG. 10.

In order to control the timer interrupt (timer interrupt control), the interrupt control unit 111 first determines whether or not the timer interrupt is ON (Step S260). For example, with reference to the interrupt management table 112, the interrupt control unit 111 determines whether or not a traffic type "stream" or "download" is registered in the interrupt management table 112, thereby determining whether or not the timer interrupt is ON. In other words, the interrupt control unit 111 determines that the timer interrupt is ON, when a traffic type "stream" or "download" is registered.

If it is determined that the timer interrupt is ON (Yes at Step S260), then the interrupt control unit 111 further determines whether or not conditions for outputting of timer interrupt (hereinafter, timer interrupt output conditions) are satisfied (Step S262). The satisfaction of the timer interrupt output conditions means that a predetermined timer time has passed since previous expiation of timer interrupt output conditions. If it is determined that the timer interrupt output conditions are satisfied (Yes at Step S262), then the interrupt control unit 111 sets an interrupt cause as timer interrupt and outputs an interrupt signal (Step S264). Here, the interrupt control unit 111 sets an elapsed time, which is to be used to determine whether or not the timer interrupt output conditions are satisfied, to be 0, or sets a time period until next satisfaction of timer interrupt output conditions to be an initial value. Then, the interrupt control unit 111 updates the elapsed time or the time period until a next satisfaction (Step S266).

On the other hand, if it is determined at Step S260 that the timer interrupt is not ON (No at Step S260), then the interrupt control unit 111 terminates the timer interrupt control. Moreover, if it is determined at Step S262 that the timer interrupt output conditions are not satisfied (No at Step S262), then the interrupt control unit 111 updates a current setting to the above-described elapsed time or the like (Step S266).

Figure 12:
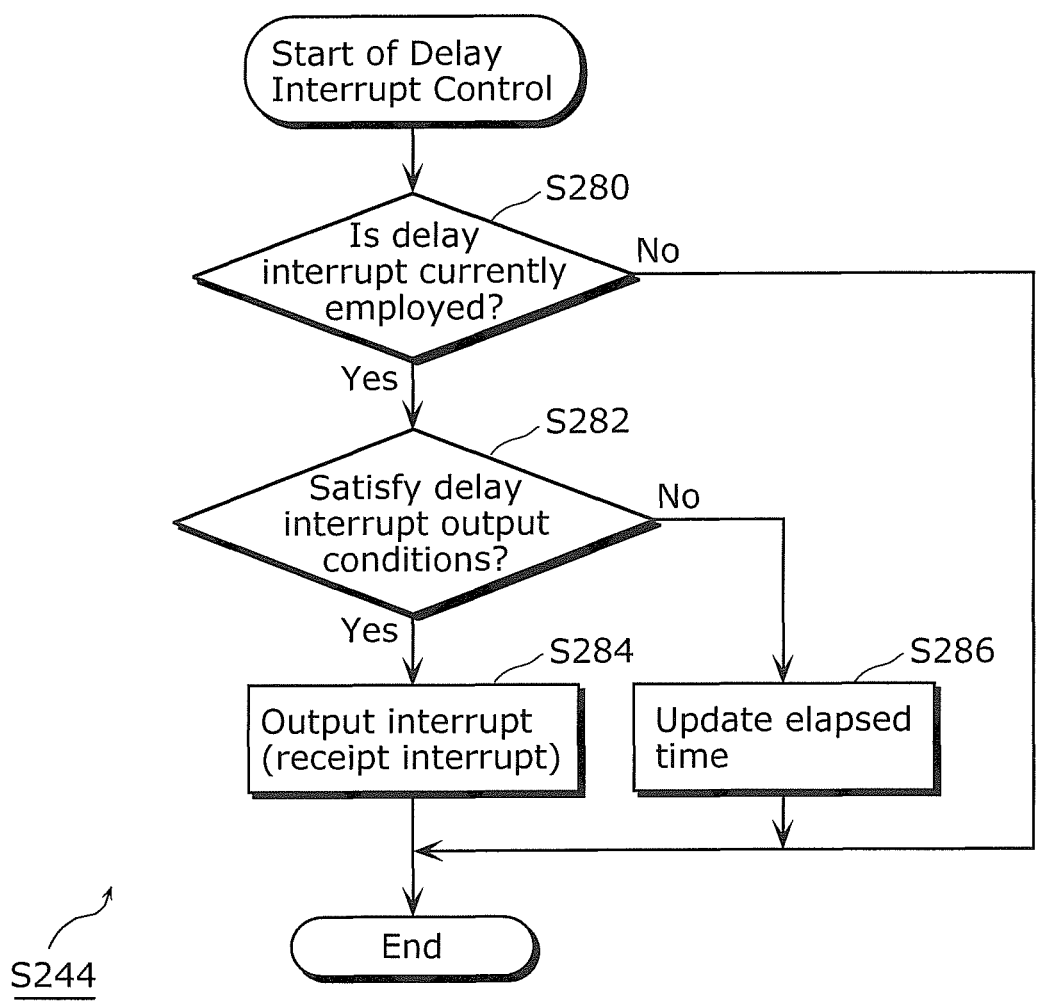
FIG. 12 is a flowchart of details of delay interrupt control executed in the interrupt output control performed by the interrupt control unit according to the embodiment of the present invention.

FIG. 12 is a flowchart of details of the delay interrupt control described as the Step S244 in FIG. 10.

In order to control the delay interrupt (delay interrupt control), the interrupt control unit 111 first determines whether or not delay interrupt is currently employed (Step S280). In other words, the interrupt control unit 111 determines whether or not "with delay interrupt" is set for receiving event occurrence by the interrupt control setting of Step S220 in FIG. 9.

If it is determined that delay interrupt is currently employed (Yes at Step S280), then the interrupt control unit 111 further determines whether or not conditions for outputting of delay interrupt (hereinafter, delay interrupt output conditions) are satisfied (Step S282). The satisfaction of the delay interrupt output conditions means that a predetermined delay time has passed since occurrence of a receiving event to cause an interrupt. If it is determined that the delay interrupt output conditions are satisfied (Yes at Step S282), then the interrupt control unit 111 sets receipt interrupt as an interrupt cause, and outputs an interrupt signal (Step S284).

On the other hand, if it is determined that the delay interrupt output conditions are not satisfied (No at Step S282), then the interrupt control unit 111 does not output any interrupt signal but updates the elapsed time, which is to be used to determine whether or not delay interrupt output conditions are satisfied, or the time period until next satisfaction of delay interrupt output conditions (Step S286). The update of the elapsed time or the like is performed for every receiving event occurrence to cause a delay interrupt. On the other hand, if it is determined at Step S280 that delay interrupt is not currently employed (No at Step S280), then interrupt control unit 111 terminates the delay interrupt control.

Here, when an interrupt signal is outputted at Step S284, the interrupt control unit 111 applies next delay interrupt output conditions to next receiving event occurrence. If there is no next receiving event occurrence to cause a next delay interrupt, the interrupt control unit 111 determines at Step S280 that delay interrupt is not currently employed. Moreover, when all receiving event occurrences to cause delay interrupts are processed by software, the interrupt control unit 111 detects based on a result of analysis of Descriptors managed by the transfer control unit 104 that the interrupt control unit 111 does not need to perform delay interrupt, and thereby determines at Step S280 that delay interrupt is not currently employed.

Figure 13:
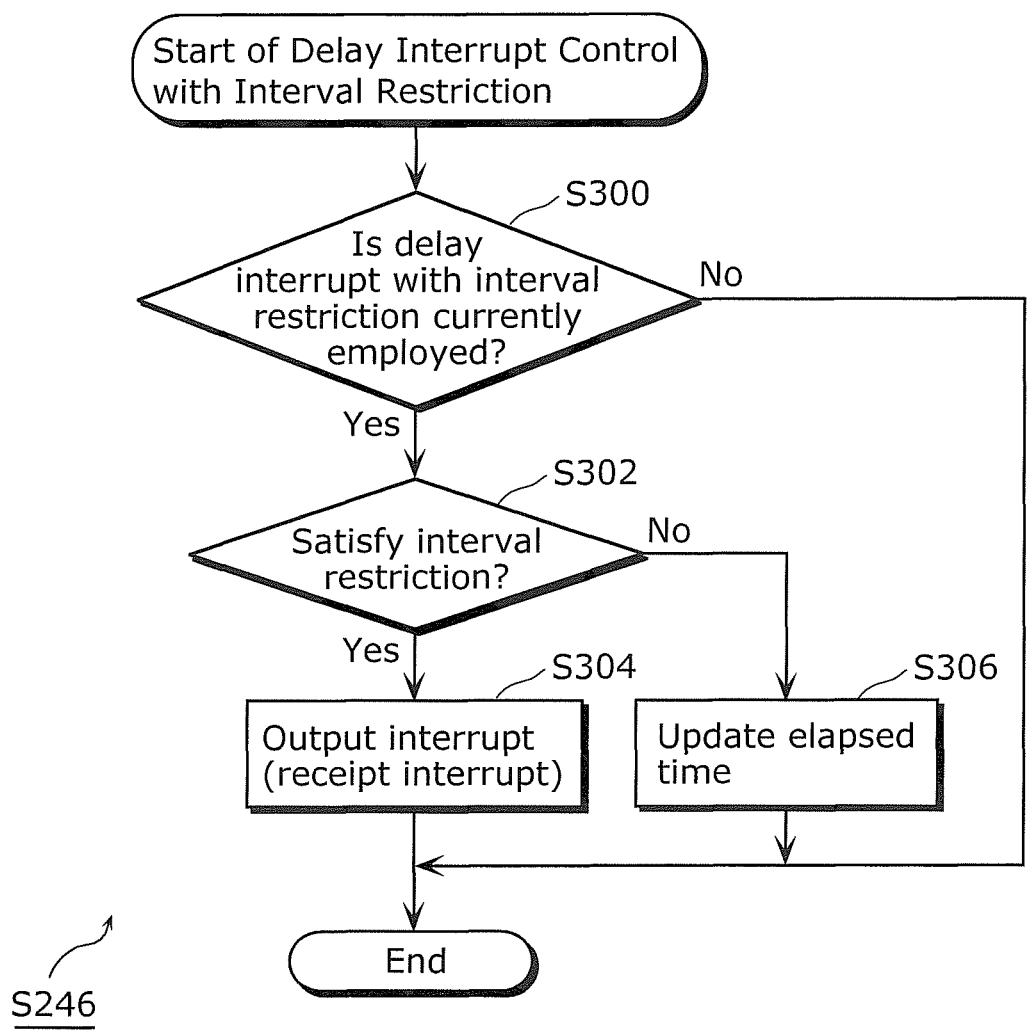
FIG. 13 is a flowchart of details of control of delay interrupt with interval restriction executed in the interrupt output control performed by the interrupt control unit according to the embodiment of the present invention.

FIG. 13 is a flowchart of details of control of the delay interrupt with interval restriction described as the Step S246 in FIG. 10.

In order to control the delay interrupt with interval restriction, the interrupt control unit 111 first determines whether or not the delay interrupt with interval restriction is currently employed (Step S300). In other words, the interrupt control unit 111 determines whether or not "with delay interrupt with interval restriction" is set for receiving event occurrence by the interrupt control setting of Step S224 in FIG. 9.

If it is determined that the delay interrupt with interval restriction is currently employed (Yes at Step S300), then the interrupt control unit 111 further determines whether or not the interval restriction is satisfied (Step S302). The satisfaction of the interval restriction means that a predetermined delay time has passed since occurrence of a receiving event to cause interrupt and the predetermined delay time has also passed since outputting of an interrupt signal of a previous delay interrupt with interval restriction, if any. If it is determined that the interval restriction is satisfied (Yes at Step S302), then the interrupt control unit 111 sets receipt interrupt as an interrupt cause, and outputs an interrupt signal (Step S304).

On the other hand, if it is determined that the interval restriction is not satisfied (No at Step S302), then the interrupt control unit 111 does not output any interrupt signal, but updates an elapsed time, which is to be used to determine whether or not interval restriction is satisfied, or updates a time period until next satisfaction of interval restriction (Step S306). On the other hand, if it is determined at Step S300 that the delay interrupt with interval restriction is not currently employed (No at Step S300), then interrupt control unit 111 terminates the control of the delay interrupt with interval restriction.

Here, when an interrupt signal is outputted at Step S304, the interrupt control unit 111 sets the elapsed time to be 0, or sets the time period until next satisfaction of interval restriction to be an initial value. Moreover, when all receiving event occurrences to cause delay interrupts with interval restriction are processed by software, the interrupt control unit 111 detects based on a result of analysis of Descriptors managed by the transfer control unit 104 that the interrupt control unit 111 does not need to perform delay interrupt with interval restriction, and thereby determines at Step S300 that the delay interrupt with interval restriction is not currently employed.

It should be noted that it has been described above that the causes of the immediate interrupt, the delay interrupt, and the delay interrupt with interval restriction are the same "receipt interrupt". However, the interrupt causes may be different depending on the interrupt.

The following describes an example of control algorithm achieved by software to implement the communication device 100 using the communication processing apparatus 101 as described above, with reference to FIGS. 14 to 16. However, since general driver software processing does not relate to the essence of the present invention, it is not described below. The following describes only the interrupt processing. Furthermore, in the following description, an order of determinations and an order of steps are not limited to the given description, which the ordinary person skilled in the art can easily suggest. Therefore, the variations are not described below.

Figure 14:
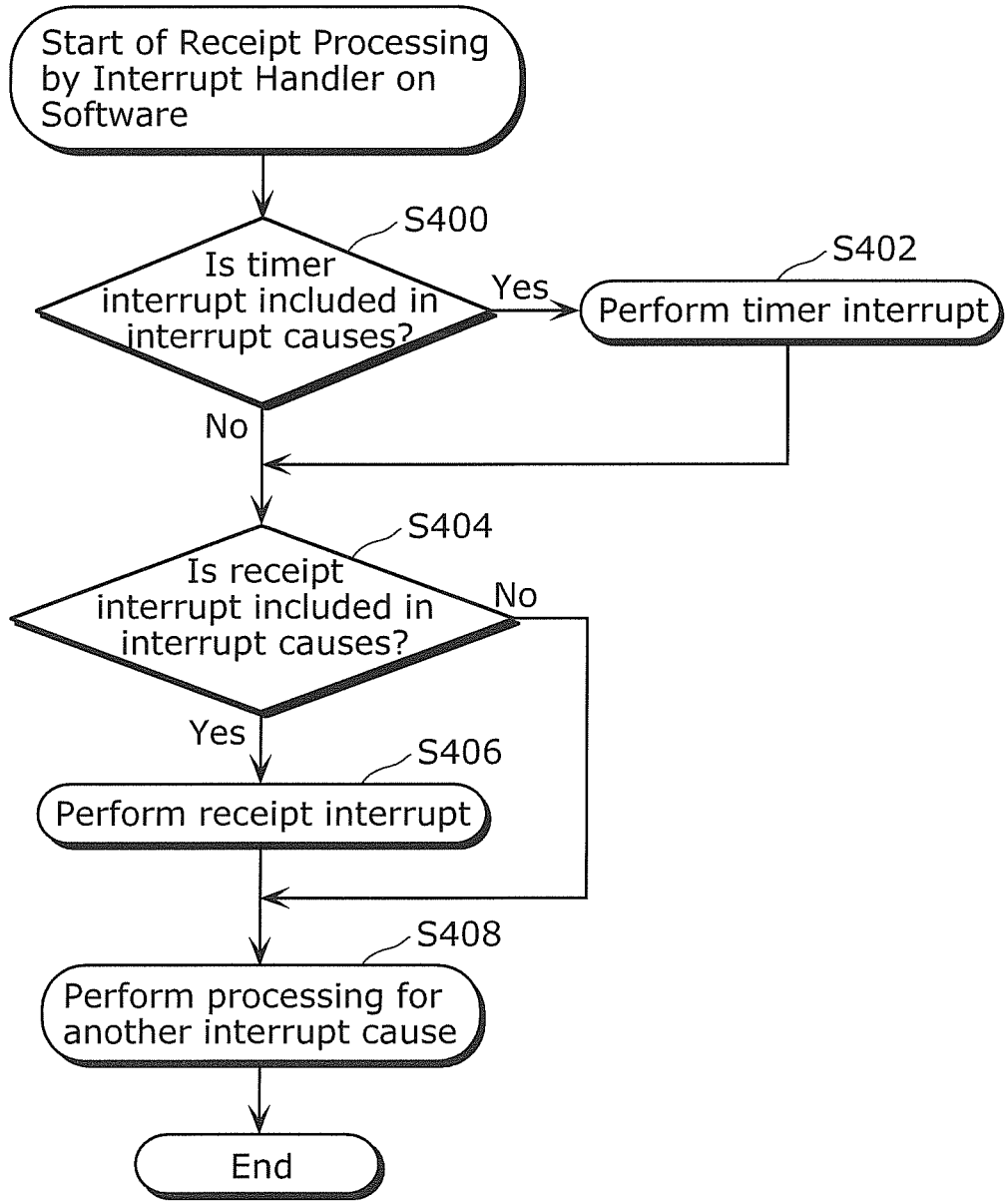
FIG. 14 is a flowchart of receipt processing performed by an interrupt handler in software controlling the communication processing apparatus according to the embodiment of the present invention.

FIG. 14 is a flowchart of receipt processing performed by an interrupt handler in software executed by the CPU 103.

The software determines whether or not the timer interrupt is set as the interrupt cause of an interrupt signal (Step S400). If it is determined that the timer interrupt is set (Yes at Step S400), then the software performs the timer interrupt (Step S402). The timer interrupt will be described in detail later with reference to FIG. 15. On the other hand, if it is determined that the timer interrupt is not set (No at Step S400), or if the timer interrupt of Step S402 is completed, then the software further determines whether or not receipt interrupt is set as an interrupt cause of an interrupt signal (Step S404).

If it is determined that receipt interrupt is set as the interrupt cause (Yes at Step S404), then the software performs receipt interrupt processing (Step S406). The receipt interrupt processing will be described in detail later with reference to FIG. 16. On the other hand, if it is determined that receipt interrupt is not set as the interrupt cause (Step S406), or if the receipt interrupt processing of Step S406 is completed, then the software performs processing for another interrupt cause (Step S408), and completes receipt processing of an interrupt handler.

Figure 15:
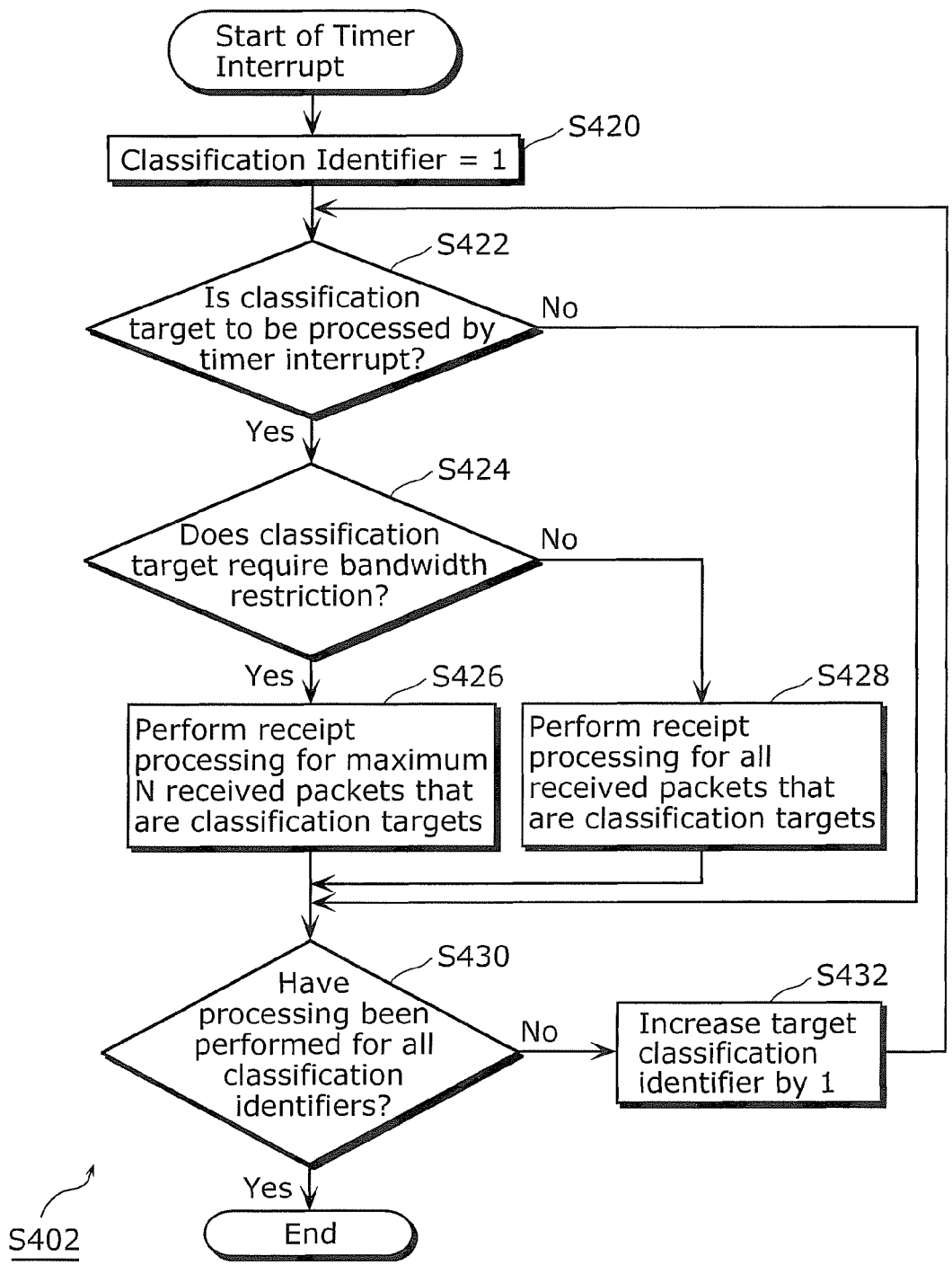
FIG. 15 is a flowchart of timer interrupt executed in the receipt processing performed by the interrupt handler in the software controlling the communication processing apparatus according to the embodiment of the present invention.

FIG. 15 is a flowchart of details of the timer interrupt described as the Step S402 in FIG. 14.

For the timer interrupt, the software first initializes a target classification identifier to be a start identifier (for example, 1) (Step S420). Next, the software determines whether or not data (hereinafter, referred to as a "classification target") associated with the target classification identifier (with an initial value of classification identifier 1) is to be processed by a timer interrupt (Step S422). Here, if Descriptors are managed by the transfer control unit 104 to be independent in association with the respective classification identifiers, management numbers assigned to the respective Descriptors enable the classification identifiers to be distinguished. As a result, the determination of Step S422 by the software can be easily made.

If it is determined that the classification target is to be processed by a timer interrupt (Yes at Step S422), then the software further determines whether or not the classification target requires bandwidth restriction (to be processed by timer interrupt with processing amount restriction) (Step S424). If it is determined that the classification target requires the bandwidth restriction (Yes at Step S424), then the software performs receipt processing for maximum N received packets from among received packets that are the above-described classification targets transferred from the communication processing apparatus 101 to the main memory 102. Here, N is a predetermined number that may be uniquely determined in the communication device 100 or in a system including the communication device 100. N may be a value different depending on each classification identifier.

On the other hand, if it is determined that the classification target does not require the bandwidth restriction (No at S424), then the software performs receipt processing for all received packets that are the above-described classification targets transferred from the communication processing apparatus 101 to the main memory 102 (Step S428). Furthermore, after completion of the receipt processing of Steps S426 and S428, or if it is determined at Step S422 that the classification target is not performed by timer interrupt (No at Step S422), then the software determines whether or not the above-described processing has been performed for all of the classification identifiers (Step S430). If it is determined that the above-described processing has been performed for all of the classification identifiers (Yes at Step S430), then the software completes the timer interrupt. On the other hand, if it is determined that the above-described processing has not yet been performed for all of the classification identifiers (No at Step S430), then the software increases the target classification identifier (for example, increases it by 1) (Step S432), and repeats the processing from Step S422.

Figure 16:
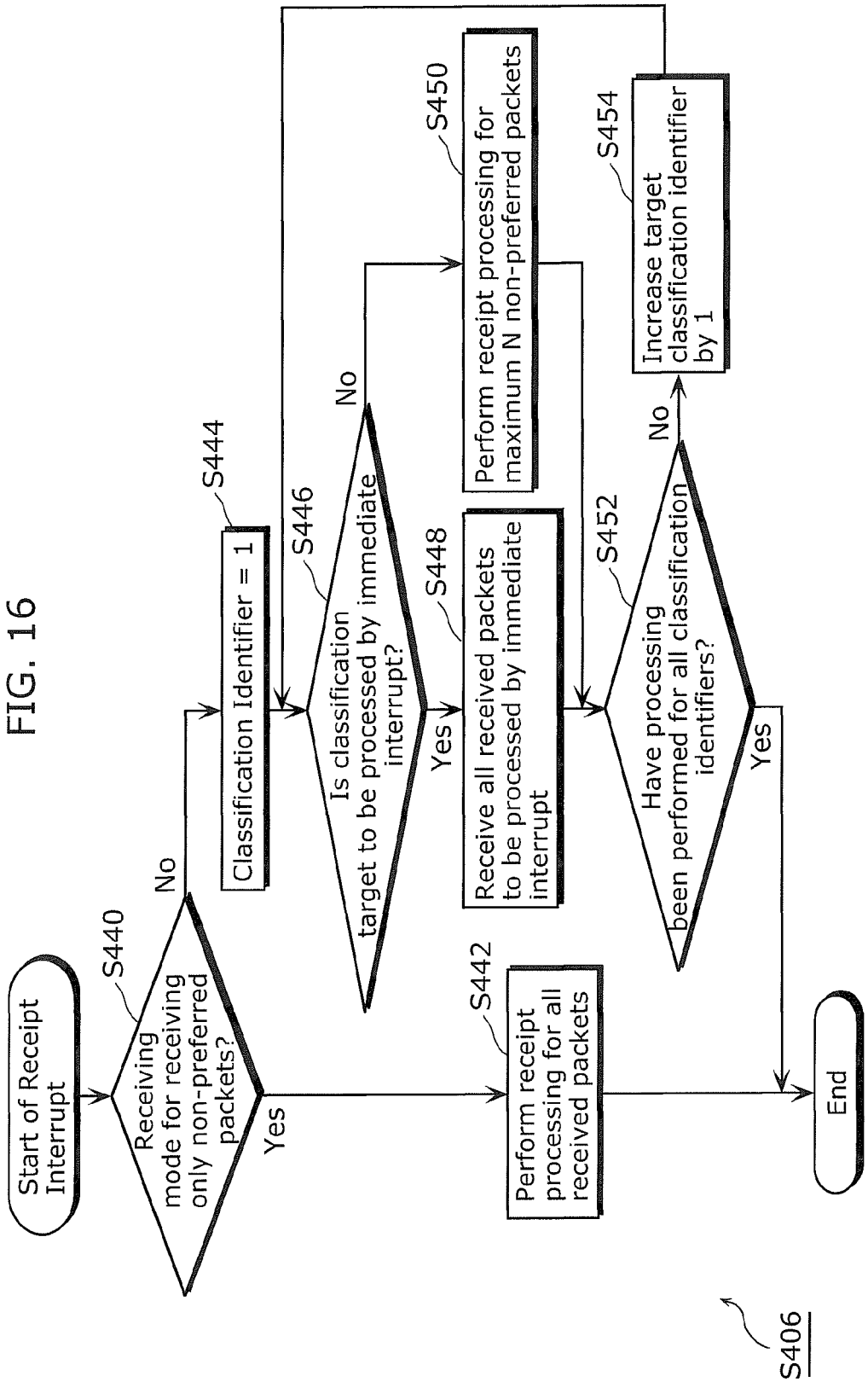
FIG. 16 is a flowchart of receipt interrupt processing executed in the receipt processing performed by the interrupt handler in the software controlling the communication processing apparatus according to the embodiment of the present invention.
Figure 17:
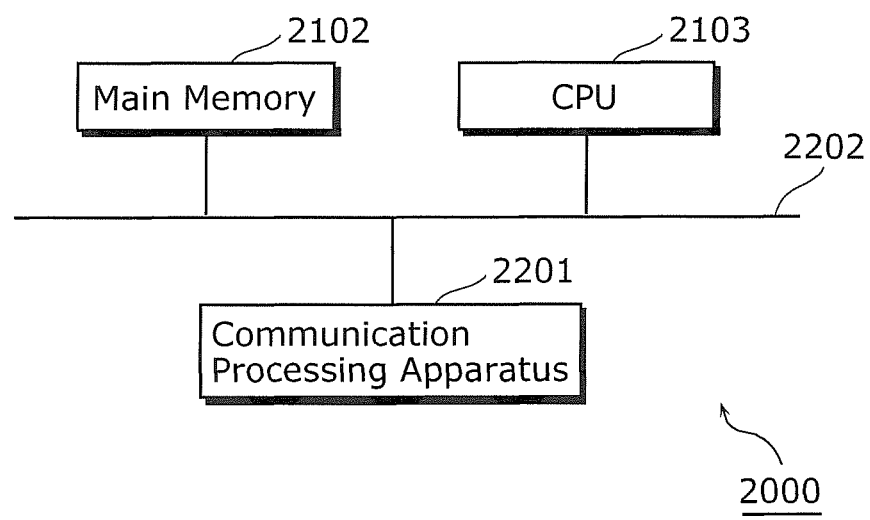
FIG. 17 is a block diagram illustrating an example of a structure of the communication device including the communication processing apparatus.
Figure 18:
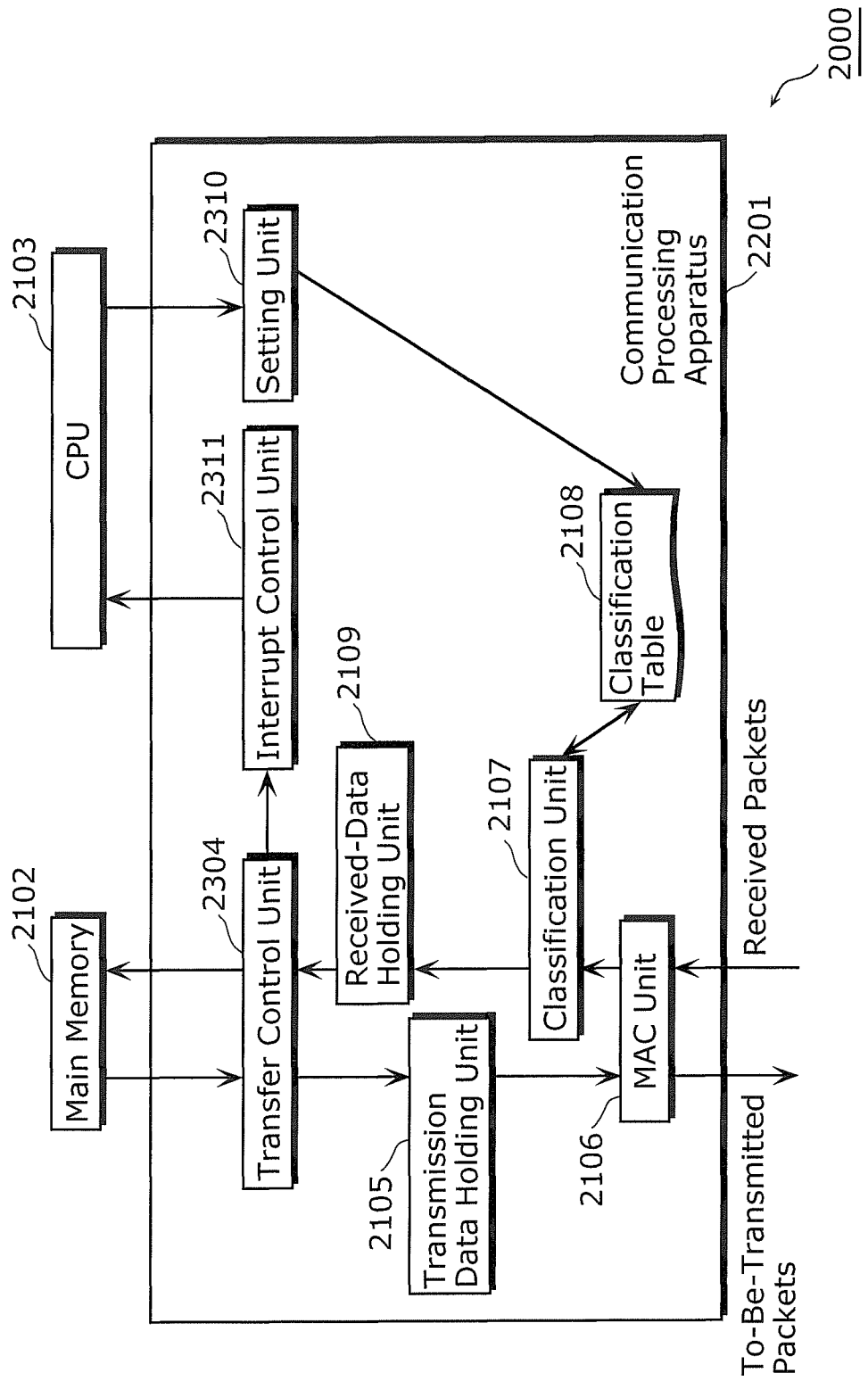
FIG. 18 is a block diagram illustrating an example of a structure of a conventional communication processing apparatus.

FIG. 16 is a flowchart of details of the receipt interrupt processing described as the Step S406 in FIG. 14.

For the receipt interrupt processing, the software first determines whether or not a receiving mode for receiving only non-preferred packets is currently set (Step S440). The receiving mode for receiving only non-preferred packets satisfies any one of the following conditions.

(1) Only the traffic type "non-preferred" is registered in the interrupt management table 112. In other words, the interrupt management table 112 does not hold any classification identifiers except classification identifiers (for example, "Default") of data to be processed by the delay interrupt or by the delay interrupt with interval restriction.

(2) The traffic type "stream" is registered in the interrupt management table 112. In other words, the interrupt management table 112 holds a classification identifier of data to be processed by the timer interrupt, but the transfer control unit 104 does not receive the data during a predetermined time period.

If it is determines at Step S440 that the receiving mode for receiving only non-preferred packets is currently set (Yes at Step S440), then the software performs receipt processing for all received packets transferred from the communication processing apparatus 101 to the main memory 102 (Step S442), and completes the receipt interrupt processing. On the other hand, if it is determines at Step S440 that the receiving mode for receiving only non-preferred packets is not currently set (No at Step S440), then the software initializes a target classification identifier to be a start identifier (for example, 1) (Step S444). Next, the software determines whether or not a classification target (in the initialization, the classification target is data associated with the classification identifier 1) is to be processed by immediate interrupt (Step S446). Here, if Descriptors are managed by the transfer control unit 104 to be independent in association with the respective classification identifiers, management numbers assigned to the respective Descriptors enable the classification identifiers to be distinguished. As a result, the determination of Step S446 by the software can be easily made.

Here, if it is determined that the classification target is to be processed by immediate interrupt (Yes at Step S446), then the software performs receipt processing for all of the received packets that are the above-described classification targets transferred from the communication processing apparatus 101 to the main memory 102, namely, that are to be processed by immediate interrupt (Step S448). On the other hand, if it is determined that the classification target is not to be processed by immediate interrupt (No at Step S446), then the software performs receipt processing for maximum M received packets from among all received packets that are to be processed by delay interrupt or delay interrupt with interval restriction, namely, from among all non-preferred packets (Step S450). Here, M is a predetermined number that may be uniquely determined in the communication device 100 or in a system including the communication device 100. M may be a value different depending on each classification identifier. M may be a value equal to the above-mentioned N.

Next, after completion of the receipt processing of Steps S448 and S450, the software determines whether or not the above-described processing has been performed for all of the classification identifiers (Step S452). If it is determined that the above-described processing has been performed for all of the classification identifiers (Yes at Step S452), then the software completes the receipt interrupt processing. On the other hand, if it is determined that the above-described processing has not yet been performed for all of the classification identifiers (No at Step S452), then the software increases the target classification identifier (for example, increases it by 1) (Step S454), and repeats the processing from Step S446.

As described above, the communication processing apparatus 101 according to the embodiment performs the followings depending on classification parameters of received packets.

(1) immediate interrupt
(2) delay interrupt
(3) delay interrupt with interval restriction
(4) timer interrupt Furthermore, the communication processing apparatus 101 classifies received packets, which is classified to be processed by timer interrupt, into packets with bandwidth restriction and other packets, so as to perform the followings.

(1) communication requiring high immediacy
(2) non-preferred communication
(3) pps restriction on non-preferred communication
(4) communication with bandwidth restriction
(5) communication for which received packets are to be processed without any restriction because restriction on receipt rate of a decoder automatically controls the receipt rate, for example, in the case of video receiving.

Although the communication processing apparatus and the communication device according to the present invention has been described using the above embodiment, the present invention is not limited to the above.

For example, it has been described in the above embodiment that the transfer control unit 104 notifies the interrupt control unit 111 of receiving event occurrence and a classification identifier corresponding to the receiving event occurrence. However, the transfer control unit 104 may notify also other information, such as a length of a received packet, which is not classified to be defined in the interrupt management table 112. The information is packet-related information related to a received packet classified by the classification unit 107. In this case, the interrupt control unit 111 specifies other different interrupt control method corresponding to (a) an interrupt control method associated with the classification identifier of the received packet in the interrupt management table 112, and (b) the above-mentioned packet-related information. Then, the interrupt control unit 111 outputs an interrupt signal by the different interrupt control method. As a result, the interrupt signal can be outputted for the receiving event occurrence by using a more proper interrupt control method. For example, delay interrupt with interval restriction is mandatorily applied for received packets each having a packet length shorter than a predetermined length, or SYN packets of TCP. Thereby, it is possible to deal with Denial of Service (DoS) attack. Furthermore, if it is detected that all Descriptors managed for respective classification identifiers are processed by software, the transfer control unit 104 notifies the fact to the interrupt control unit 111. Thereby, unnecessary interrupts can be suppressed. Here, the interrupt control unit 111 may search out the Descriptors to perform the same processing.

Moreover, the following is also possible. The setting unit 110 registers, in the interrupt management table 112, one or more combination of (a) a classification identifier and (b) a traffic type (interrupt control method) associated with the classification identifier. If such combination registered in the interrupt management table 112 is a predetermined combination, then the interrupt control unit 111 employs a predetermined interrupt control method, which is different from the interrupt control method registered in the interrupt management table 112 in association with the classification identifier of the received packet, to output an interrupt signal. For example, when only one method, which is delay interrupt, is registered as an interrupt control method in the interrupt management table 112, the interrupt control unit 111 may output an interrupt signal using immediate interrupt. Thereby, it is possible to improve throughput of receipt processing for a packet to be processed by delay interrupt.

Furthermore, since the transfer control unit 104 transfers packet data to the main memory 102, the transfer control unit 104 may designate an interrupt control method using a Descriptor used by the transfer control unit 104. In this case, it is possible to change interrupt control for each packet.

Moreover, the communication processing apparatus 101 according to the above embodiment may be implemented as a single Large Scale Integration (LSI), or as a semiconductor Intellectual Property (IP) core embedded in a System On Chip (SoC) or the like. More specifically, functional blocks in the block diagrams (FIG. 1, etc.) are typically implemented into a LSI which is an integrated circuit. These may be integrated separately, or a part or all of them may be integrated into a single chip. (For example, functional blocks except a memory may be integrated into a single chip.) Here, the integrated circuit is referred to as a LSI, but the integrated circuit can be called an IC, a system LSI, a super LSI or an ultra LSI depending on their degrees of integration.

The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured. Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation It should also be noted that only a means for storing data to be coded or decoded, among these functional blocks, may be realized as another structure, without being integrated into the single chip.

Furthermore, the communication processing apparatus 101 according to the above embodiment has been described to include the transfer control unit 104 which uses Direct Memory Access (DMA) employing Descriptors to further increase transfer efficiency. However, this does not mean that the present invention can be implemented only by using DMA employing Descriptors. The ordinary person skilled in the art easily suggests that the present invention can be implemented also in the situation where transfer is performed by programmed input-output (I/O) for each packet receipt, without using DMA.

It should also be noted that the embodiment disclosed above is merely exemplary in every aspect and does not limit the present invention. The scope of the present invention is indicated not by the above description but by the appended claims. Any modifications in the embodiment are intended to have the same meaning and be included within the scope of the claims.

INDUSTRIAL APPLICABILITY

The communication processing apparatus, the communication processing method, and the communication device including the communication processing apparatus which are according to the present invention can implement a proper communication function in an apparatus, such as home electronics, having relatively low processing resources. More particularly, they are useful to perform communication, which has a communication bandwidth significantly influencing quality of applications, to be mixed with other communication. For example, they can be applied to television sets, recorders, recording/reproducing apparatuses, set top boxes, Internet Protocol (IP) communication devices, and the like.

NUMERICAL REFERENCES 100 communication device
101 communication processing apparatus
102 main memory
103 CPU
104 transfer control unit
105 transmission data holding unit
106 MAC unit
107 classification unit
108 classification table
108m second memory
109 received-data holding unit
110 setting unit
111 interrupt control unit
112 interrupt management table
112m first memory

The invention claimed is:

1. A communication processing apparatus comprising:
a receiving unit configured to receive a packet;
a classification unit configured to decide a classification of the packet;
an interrupt control unit configured to output an interrupt signal by using an interrupt control method associated with the classification; and
a setting unit configured to change the association between the classification and the interrupt control method based on communication path information used by said receiving unit to receive the packet,
wherein said setting unit is further configured to, when said receiving unit receives a packet classified to a classification that is not indicated in an interrupt management table, add the classification and an interrupt control method for the packet in association with each other into the interrupt management table according to instruction from an application program, so as to update the interrupt management table, and
said interrupt control unit is further configured to (i) specify, with reference to the interrupt management table, the interrupt control method associated with the classification decided by said classification unit, and (ii) output the interrupt signal by using the specified interrupt control method.

2. The communication processing apparatus according to claim 1,
wherein said setting unit is configured to change the association by (i) obtaining the communication path information from the application program, and (ii) registering, into the interrupt management table, the classification and the interrupt control method which correspond to the communication path information.

3. The communication processing apparatus according to claim 1,
wherein said setting unit is further configured to associate a first classification with a first interrupt control method, and associate a second classification with a second interrupt control method, and
said interrupt control unit is configured to:
when the classification of the packet which is decided by said classification unit is the first classification, output the interrupt signal by using the first interrupt control method associated with the first classification; and
when the classification of the packet which is decided by said classification unit is the second classification, output the interrupt signal by using the second interrupt control method associated with the second classification.

4. The communication processing apparatus according to claim 1,
wherein said setting unit is further configured to register, into the interrupt management table, at least one combination of the classification and the interrupt control method associated with the classification, and
said interrupt control unit is further configured to, when the at least one combination registered in the interrupt management table is a predetermined combination, output the interrupt signal by using a predetermined different interrupt control method, the predetermined different interrupt control method being different from the interrupt control method registered in the interrupt management table in association with the classification of the packet which is decided by said classification unit.

5. The communication processing apparatus according to claim 4,
wherein said interrupt control unit is configured to, when a delay interrupt method is only one interrupt control method registered in the interrupt management table, output the interrupt signal by using an immediate interrupt method, the delay interrupt method being for outputting the interrupt signal when a predetermined time period has passed since transfer of data of the packet to a memory, and the immediate interrupt method being for outputting the interrupt signal immediately after the transfer of the data of the packet to the memory.

6. The communication processing apparatus according to claim 1,
wherein said setting unit is further configured to associate as the interrupt control method with the classification, at least one of an immediate interrupt method, a delay interrupt method, a delay interrupt method with interval restriction, and a timer interrupt method, the immediate interrupt method being for outputting the interrupt signal immediately after transfer of data of the packet to a memory, the delay interrupt method being for outputting the interrupt signal when a predetermined time period has passed since the transfer, the delay interrupt method with interval restriction being for outputting the interrupt signal when a predetermined time period has passed since the transfer and since outputting of an immediately-prior interrupt signal, and the timer interrupt method being for outputting the interrupt signal for each elapse of a predetermined time period.

7. The communication processing apparatus according to claim 1, further comprising
a transfer control unit configured to notify said interrupt control unit of packet-related information, the packet-related information being related to the packet having the classification decided by said classification unit,
wherein said interrupt control unit is further configured to, when the packet-related information is notified from said transfer control unit, (i) specify a different interrupt control method, and (ii) output the interrupt signal by using the different interrupt control method, the different interrupt control method corresponding to (a) the interrupt control method associated with the classification of the packet, and (b) the packet-related information.

8. The communication processing apparatus according to claim 1,
wherein said setting unit is further configured to associate the classification with the interrupt control method, by registering, into the interrupt management table, the classification as a classification identifier, and the interrupt control method as a traffic type, the classification identifier identifying the classification, and the traffic type uniquely defining the interrupt control method.

9. An apparatus comprising a communication device, said communication device including a communication processing apparatus and a processing unit, said communication processing apparatus outputting an interrupt signal to the processing unit,
wherein said communication processing apparatus includes:
a receiving unit configured to receive a packet;
a classification unit configured to decide a classification of the packet;
an interrupt control unit configured to output the interrupt signal to said processing unit by using an interrupt control method associated with the classification; and
a setting unit configured to change the association between the classification and the interrupt control method based on communication path information used by said receiving unit to receive the packet,
wherein said processing unit is configured to
(i) activate an application program, (ii) establish a communication path to said communication processing apparatus by the application program, and (iii) output, to said communication processing apparatus, the communication path information for specifying the communication path, and
wherein said apparatus is one of a television set, a recorder, a recording and reproducing apparatus, a set top box, and an Internet Protocol (IP) communication device.

* * * * *